(12) United States Patent
Kawamoto et al.

(10) Patent No.: US 11,979,042 B2
(45) Date of Patent: May 7, 2024

(54) CHARGING / DISCHARGING CONTROL DEVICE AND DC POWER SUPPLY SYSTEM

(71) Applicants: KABUSHIKI KAISHA TOSHIBA, Tokyo (JP); TOSHIBA ENERGY SYSTEMS & SOLUTIONS CORPORATION, Kawasaki (JP)

(72) Inventors: Shinya Kawamoto, Kawasaki Kanagawa (JP); Kenji Mitsumoto, Kawasaki Kanagawa (JP)

(73) Assignees: Kabushiki Kaisha Toshiba, Tokyo (JP); Toshiba Energy Systems & Solutions Corporation, Kawasaki (JP)

( * ) Notice: Subject to any disclaimer, the term of this patent is extended or adjusted under 35 U.S.C. 154(b) by 460 days.

(21) Appl. No.: 17/274,146

(22) PCT Filed: Nov. 15, 2018

(86) PCT No.: PCT/JP2018/042304
§ 371 (c)(1),
(2) Date: Mar. 5, 2021

(87) PCT Pub. No.: WO2020/100256
PCT Pub. Date: May 22, 2020

(65) Prior Publication Data
US 2021/0305832 A1  Sep. 30, 2021

(51) Int. Cl.
*H02J 7/00* (2006.01)
(52) U.S. Cl.
CPC ........ *H02J 7/00306* (2020.01); *H02J 7/0069* (2020.01); *H02J 7/007182* (2020.01)
(58) Field of Classification Search
USPC ....................................................... 320/134
See application file for complete search history.

(56) References Cited

U.S. PATENT DOCUMENTS

2007/0103118 A1  5/2007  Takagi et al.
2012/0133335 A1*  5/2012  Tanabe ............... H02J 50/80
                                                        320/137

(Continued)

FOREIGN PATENT DOCUMENTS

JP    H7-336912 A    12/1995
JP    2007-129898 A   5/2007
JP    2016-019363 A   2/2016

OTHER PUBLICATIONS

International Search Report issued by the International Searching Authority in related PCT Application No. PCT/JP2018/042304; dated Jan. 15, 2019 (2 pgs.).

*Primary Examiner* — Mohammed Alam
(74) *Attorney, Agent, or Firm* — Finnegan, Henderson, Farabow, Garrett & Dunner, LLP

(57) ABSTRACT

A charging and discharging control device includes one or more processors configured to determine, in response to a stop of alternate-current power supply, whether a voltage value of a storage battery, being capable of supplying power to a direct-current load, is a first threshold or less; determine, in response to a restart of the alternate-current power supply, whether a difference in voltage value between the storage battery and direct-current power output from a rectifier is a second threshold or less; disconnect between the storage battery, and the rectifier and the direct-current load when determining the voltage value of the storage battery as being the first threshold or less, and reconnect from the rectifier to the storage battery when determining the difference in voltage value between the storage battery and the direct-current power is the second threshold or less.

15 Claims, 13 Drawing Sheets

(56) References Cited

U.S. PATENT DOCUMENTS

2012/0146577 A1\* 6/2012 Tanabe ................ H02J 50/80
                                                           320/108
2017/0104368 A1\* 4/2017 Radke ................. H02J 50/80
2019/0044321 A1\* 2/2019 Misawa ............... H02J 50/12

\* cited by examiner

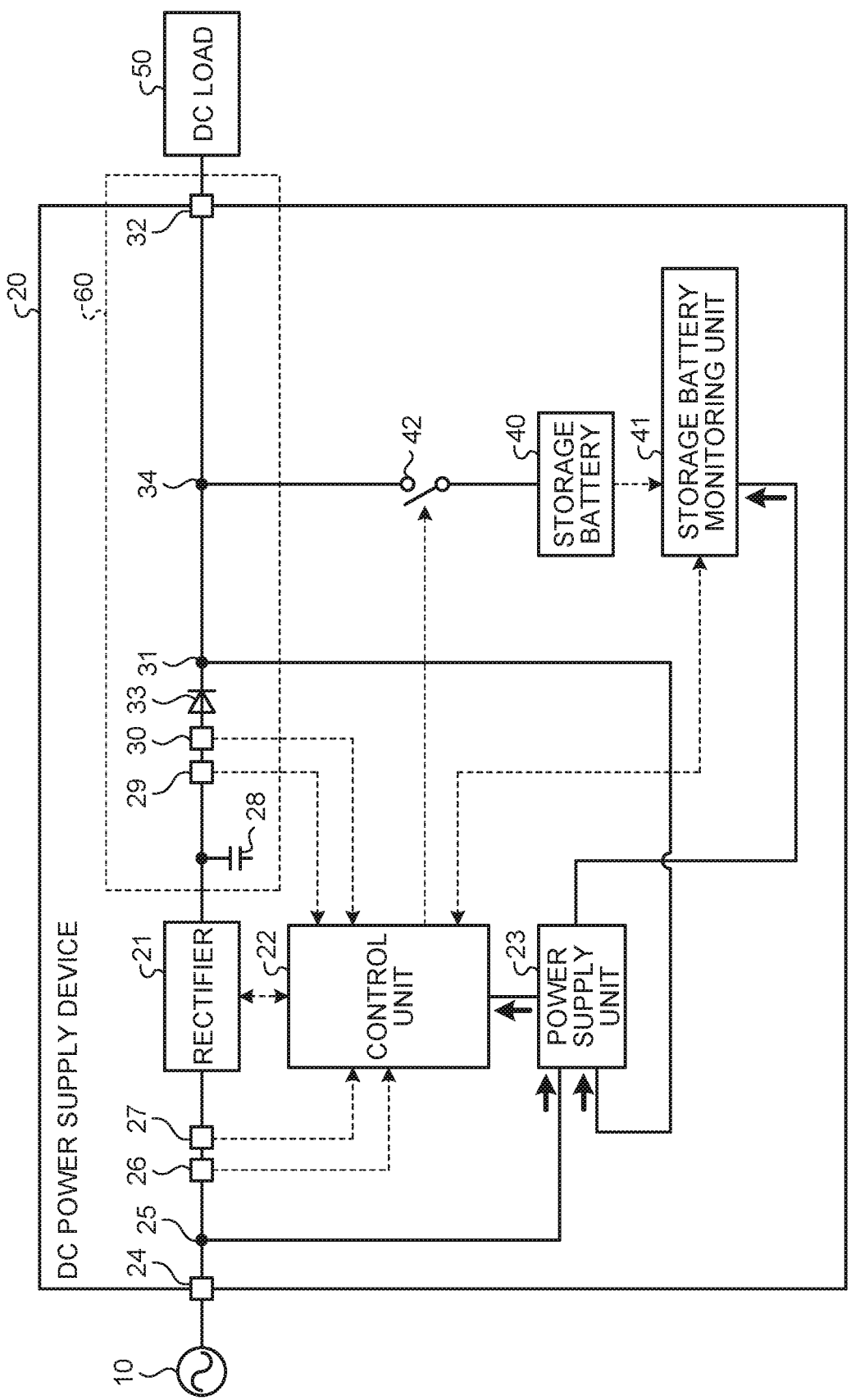

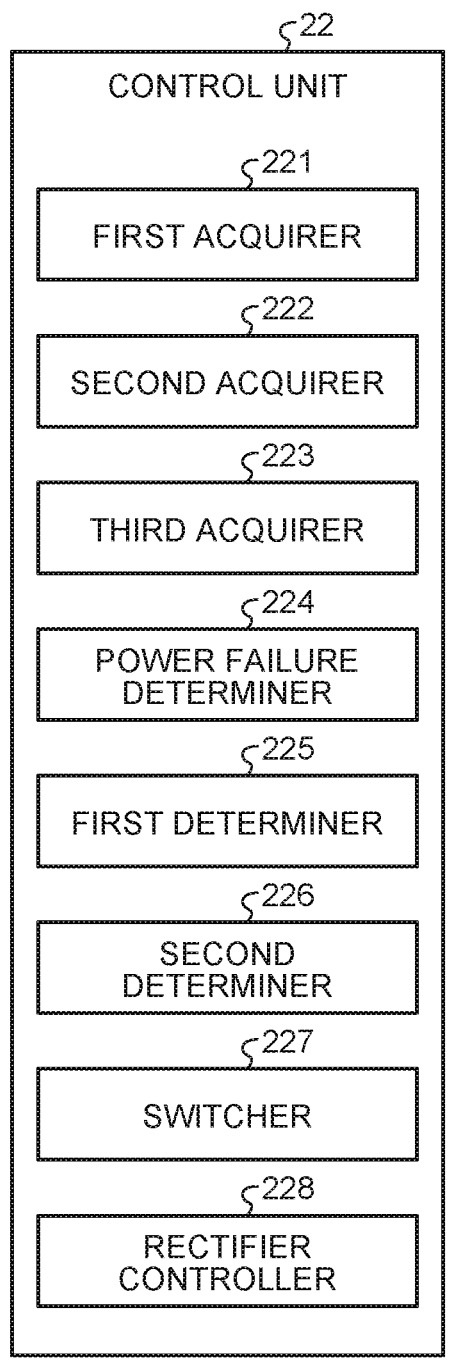

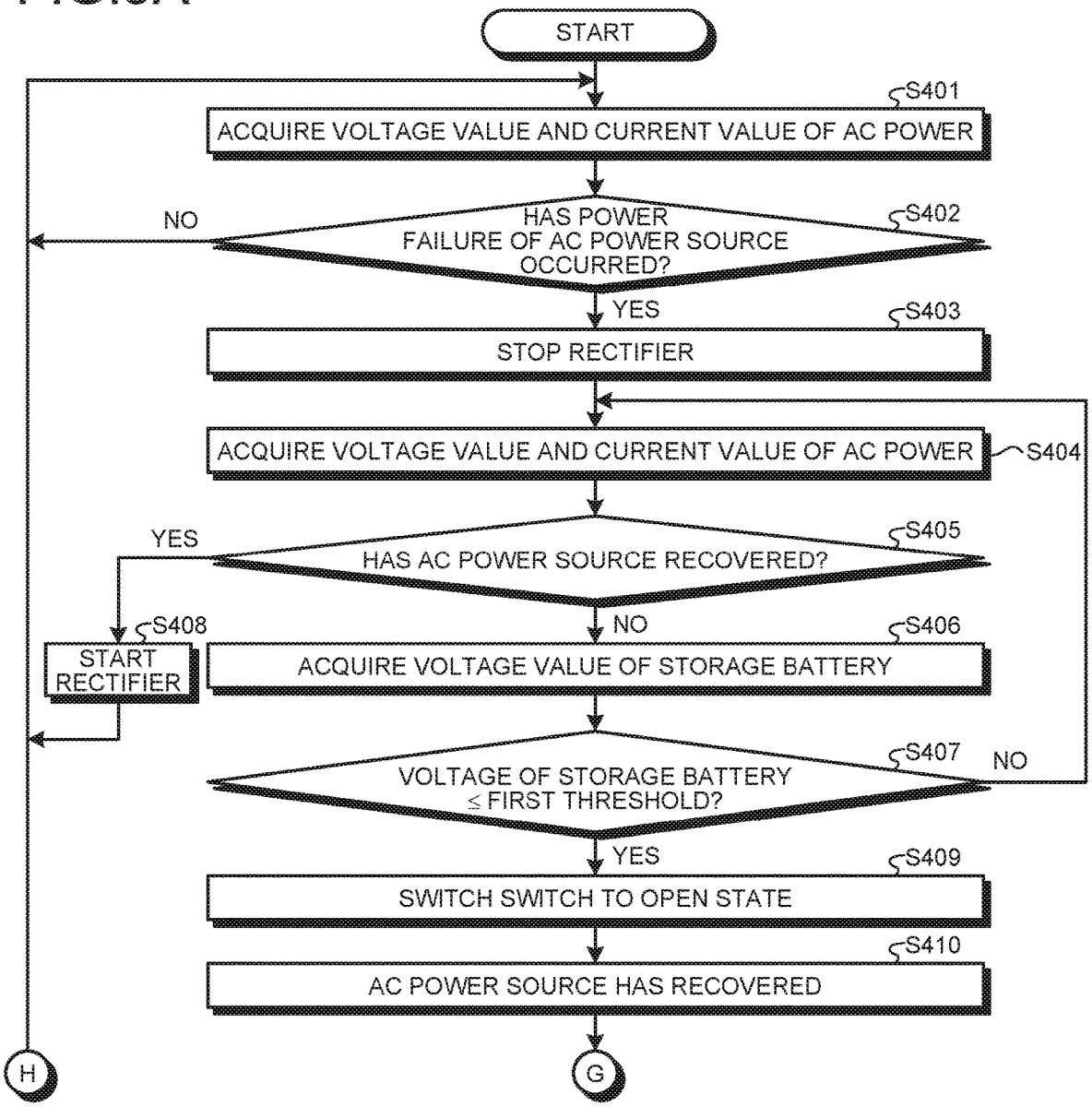

CHARGING / DISCHARGING CONTROL DEVICE AND DC POWER SUPPLY SYSTEM

CROSS-REFERENCE TO RELATED APPLICATIONS

This application is a National Stage Application of International Application No. PCT/JP2018/042304, filed Nov. 15, 2018, which designates the United States, the entire contents of which are incorporated herein by reference.

FIELD

Embodiments described herein relate generally to a charging and discharging control device and a direct-current power supply system.

BACKGROUND

Conventionally, direct-current (DC) power supply systems have been used for converting alternate-current (AC) power such as a commercial power supply into direct-current for supply to DC loads. For stable DC power supply, some DC power supply systems store DC power supplied from a rectifier in storage batteries in normal situation, to supply the power from the storage batteries to DC loads in the case of a power failure of a commercial power supply. For example, DC power supply systems including lead-acid storage batteries as storage batteries have been known.

Meanwhile, in recent years there have been growing needs for use of lithium-ion batteries having high energy density, rapid charging performance, and long-lifetime characteristics as storage batteries. Lithium-ion batteries require more secure prevention of overdischarge than lead-acid batteries. In this regard, there is a known technique for disconnecting lithium-ion batteries from the rectifier and the DC load before overdischarge in response to occurrence of a long-time power failure.

However, at the time of reconnecting the lithium-ion batteries to the rectifier and the DC load after recovery from the power failure, greater inrush current may flow into the lithium-ion batteries depending on the magnitude of differences between the voltages of the discharged lithium-ion batteries and the applied voltage from the rectifier. In view of this, traditionally, the worker checks the voltages of the lithium-ion batteries and manually regulates the setting of the rectifier before reconnecting the lithium-ion batteries, which may cause difficulty in resuming charging quickly after power recovery.

BRIEF DESCRIPTION OF DRAWINGS

FIG. 1 is a diagram illustrating an exemplary overall configuration of a direct-current power supply device according to a first embodiment;

FIG. 2 is a diagram illustrating an exemplary functional configuration of a control device according to the first embodiment;

FIGS. 9A and 9B are a flowchart illustrating an example of processing executed by the direct-current power supply device according to the fourth embodiment.

DETAILED DESCRIPTION

Figure 3A:
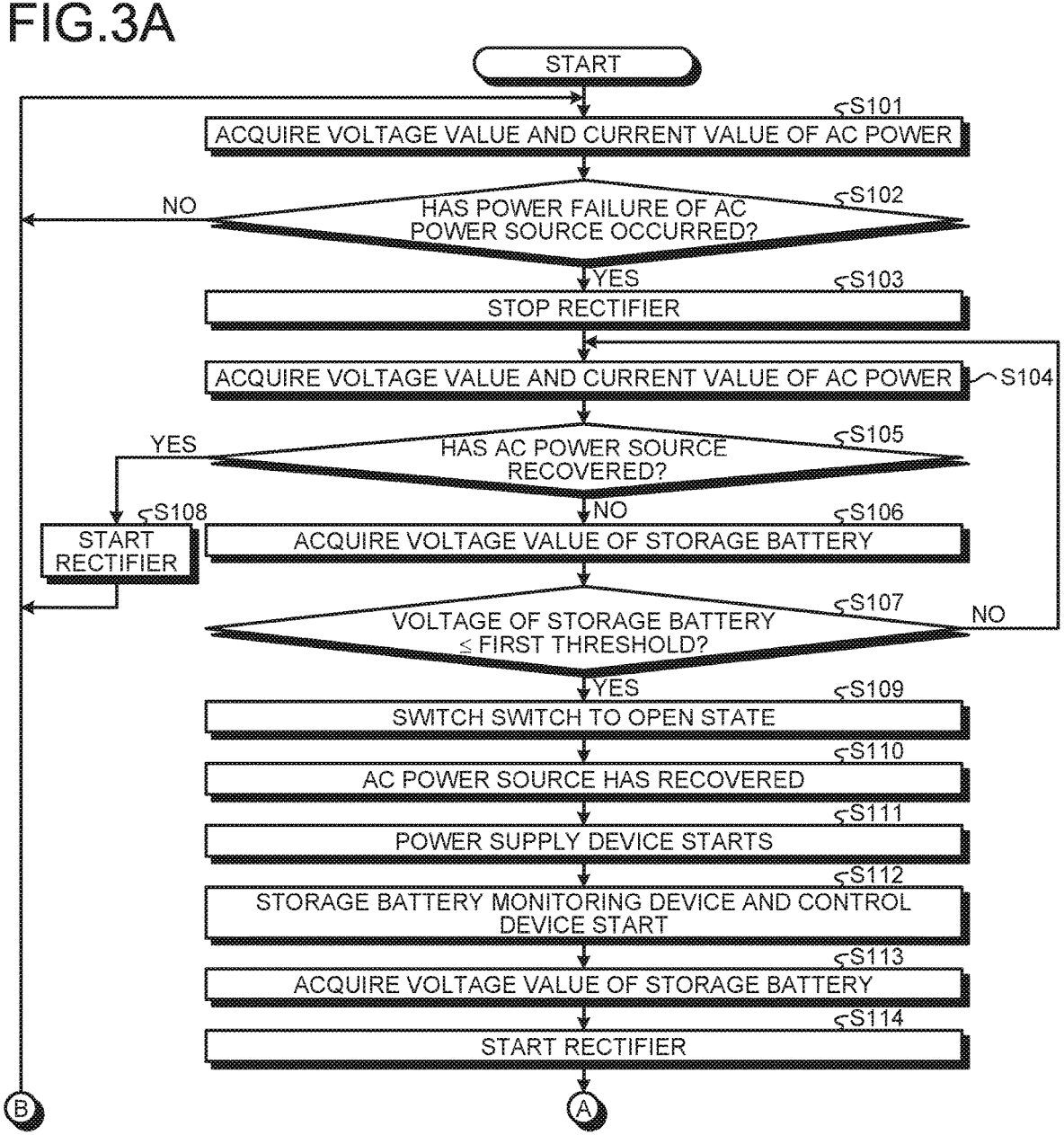
FIGS. 3A and 3B are a flowchart illustrating an example of processing executed by the direct-current power supply device according to the first embodiment.

According to one embodiment, in general, a charging and discharging control device includes one or more processors configured to: determine, in response to a stop of alternate-current power supply, whether a first voltage value, being capable of supplying power to a direct-current load, is equal to or smaller than a first threshold, the storage battery, the first voltage value being a voltage value of a storage battery; determine, in response to a restart of the alternate-current power supply, whether a difference between the first voltage value and a second voltage value output from a rectifier is equal to or smaller than a second threshold, the rectifier converting the alternate-current power into direct-current power for supply to the direct-current load and the storage battery, the second voltage value being a voltage value of direct-current power; disconnect between the storage battery, and the rectifier and the direct-current load when determining that the first voltage value is equal to or smaller than the first threshold, and reconnect from the rectifier to the storage battery when determining that the difference between the first voltage value and the second voltage value is equal to or smaller than the second threshold.

First Embodiment

FIG. 1 is a diagram illustrating an exemplary overall configuration of a direct-current (DC) power supply device 20 according to a first embodiment. As illustrated in FIG. 1, the DC power supply device 20 includes a rectifier 21, a control unit 22, a power supply unit 23, a storage battery 40, a storage battery monitoring unit 41, an alternate-current (AC) input terminal 24, an AC-side current sensor 26, an AC-side voltage sensor 27, a capacitor 28, a DC-side current sensor 29, a DC-side voltage sensor 30, a DC output terminal 32, a diode 33, and a switch 42. The DC power supply device 20 represents an exemplary DC power supply system in the present embodiment.

In the present embodiment, the capacitor 28, the DC-side current sensor 29, the DC-side voltage sensor 30, the DC output terminal 32, and the diode 33 may be collectively referred to as DC circuit 60. The DC circuit 60 is located between the rectifier 21 and a DC load 50.

The AC input terminal 24 receives AC power from an AC power source 10. The AC power source 10 is, for example, a commercial power supply.

The rectifier 21 functions as a power convertor that converts AC power supplied from the AC power source 10 into DC power with a predefined voltage for output to the DC load 50 and the storage battery 40. The rectifier 21 uses the AC power received at the AC input terminal 24 as input power. Specifically, examples of the rectifier 21 include a thyristor rectifier, a transistor rectifier, and etc.

The DC power supply device 20 of the present embodiment adopts a float charging system in which the DC load 50 and the storage battery 40 are connected in parallel to the rectifier 21 to charge the storage battery 40 simultaneously with the power supply to the DC load 50. In the float charging system, normally, that is, during power supply from the AC power source 10, the DC load 50 is supplied with the power from the rectifier 21. In the case of a power failure of the AC power source 10, that is, in response to a stop of the power supply from the AC power source 10, the DC load 50 is supplied with the power discharged from the storage battery 40. In the present embodiment, the rectifier 21 is set to a predefined voltage, that is, a predefined value of a float charging voltage.

The DC load 50 is, for example, a device or an illumination fixture that consumes DC power. The DC power output from the rectifier 21 branches at a third branch 34 and is supplied to the DC load 50 and the storage battery 40. More specifically, the DC output terminal 32 supplies the DC load 50 with the DC power converted by the rectifier 21.

The storage battery 40 is a battery back including a plurality of battery cells connected in series and in parallel. The battery cells are secondary batteries re-usable by charging. In the present embodiment, the battery cells are lithium-ion batteries, and may be, for example, lead-acid batteries or nickel-cadmium batteries.

The storage battery 40 is capable of supplying power to the DC load 50. Specifically, the storage battery 40 is connected to the rectifier 21 and the DC load 50 through the DC circuit 60. In normal situation, that is, during power supply from the AC power source 10, the storage battery 40 is charged with the power from the rectifier 21. In the event of a power failure of the AC power source 10, the storage battery 40 supplies power to the DC load 50.

The switch 42 is located between the storage battery 40, and the rectifier 21 and the DC loader 50. More specifically, the switch 42 is located between the DC circuit 60 and the storage battery 40. The switch 42 is opened or closed in accordance with an instruction from the control unit 22, as described later, thereby connecting or disconnecting the storage battery 40 to or from the rectifier 21 and the DC loader 50. In the closed state of the switch 42, the storage battery 40 is connected to the rectifier 21 and the DC loader 50 while in the open state of the switch 42, the storage battery 40 is disconnected from the rectifier 21 and the DC loader 50. The switch 42 is normally placed in the closed state. The open state of the switch 42 may be referred to as a disconnection of the storage battery 40 from the DC circuit 60.

The AC-side current sensor 26 detects a current value of the AC power from the AC input terminal 24 and outputs a result of the detection to the control unit 22. The AC-side voltage sensor 27 detects a voltage value of the AC power from the AC input terminal 24 and outputs a result of the detection to the control unit 22. The AC-side current sensor 26 and the AC-side voltage sensor 27 are placed closer to the AC input terminal 24 than the rectifier 21.

The capacitor 28 is attached to the output side of the rectifier 21 to temporarily store therein DC power from the rectifier 21. Due to the temporary storing of DC power in the capacitor 28, the DC power voltage, when output from the rectifier 21, is stabilized.

The DC-side current sensor 29 detects a current value of the DC power output from the rectifier 21 and outputs a result of the detection to the control unit 22. The DC-side voltage sensor 30 detects a voltage value of the DC power output from the rectifier 21, and outputs a result of the detection to the control unit 22. In the present embodiment, the DC-side current sensor 29 and the DC-side voltage sensor 30 are placed on the opposite side of the rectifier 21 across the capacitor 28.

The diode 33 serves as an anti-backflow diode that prevents a discharged current from the storage battery 40 from flowing backward to the rectifier 21. In the present embodiment, the diode 33 is located on the output side of the rectifier 21. The diode 33 allows a current output from the rectifier 21 to flow into the DC load 50 and the storage battery 40, and prevents the discharged current from flowing into the storage battery 40 to the rectifier 21.

The control unit 22 receives the results of the detection from the AC-side current sensor 26, the AC-side voltage sensor 27, the DC-side current sensor 29, and the DC-side voltage sensor 30, to set a predefined voltage to the rectifier 21 according to the results of the detection. The control unit 22 controls the opening/closing of the switch 42 to disconnect or reconnect between the storage battery 40, and the rectifier and the DC load 50. The control unit 22 of the present embodiment may be a computer including a processor or processors as a CPU and memories. The memories are, for example, a read only memory (ROM), a random access memory (RAM), and a flash memory. The control unit 22 is an exemplary charging and discharging control device in the present embodiment. Details of functions of the control unit 22 will be described later.

The power supply unit 23 is a device for supplying operational power (control power) to the control unit 22 and the storage battery monitoring unit 41. More specifically, the power supply unit 23 receives AC power through a first branch 25 and DC power through a second branch 31 for use as input power. While receiving at least either of the AC power and the DC power, the power supply unit 23 generates control power from the input power and supplies the control power to the control unit 22 and the storage battery monitoring unit 41. In other words, the power supply unit 23 operates with AC power while being supplied with the power from the AC power source 10, and operates with DC power discharged from the storage battery 40 during stop of the power supply from the AC power source 10. The control power may be DC power with a given voltage. The power supply unit 23 may be referred to as control power supply unit.

The storage battery monitoring unit 41 represents a device for monitoring the state of the storage battery. More specifically, the storage battery monitoring unit 41 measures the voltage of the storage battery 40 and outputs a result of the measurement to the control unit 22. The storage battery monitoring unit 41 may measure the current or temperature of the storage battery 40 instead of or in addition to the voltage. The storage battery monitoring unit 41 may be, for example, a cell monitoring unit (CMU) or a battery management unit (BMU).

The following will describe the functions of the control unit 22.

FIG. 2 is a block diagram illustrating an exemplary functional configuration of the control unit 22 in the present embodiment. As illustrated in FIG. 2, the control unit 22 includes a first acquirer 221, a second acquirer 222, a third acquirer 223, a power failure determiner 224, a first determiner 225, a second determiner 226, a switcher 227, and a rectifier controller 228.

The first acquirer 221 acquires a voltage value of the storage battery 40 from the storage battery monitoring unit 41. The first acquirer 221 transmits the acquired voltage value to the first determiner 225, the second determiner 226, and the rectifier controller 228.

The second acquirer 222 acquires, from the DC-side voltage sensor 30, a voltage value of DC power output from the rectifier 21. The second acquirer 222 acquires, from the DC-side current sensor 29, a current value of the DC power output from the rectifier 21. The second acquirer 222 transmits the acquired voltage value and current value to the second determiner 226.

The third acquirer 223 acquires, from the AC-side current sensor 26, a current value of AC power input from the AC input terminal 24. The third acquirer 223 acquires, from the AC-side voltage sensor 27, a voltage value of the AC power input from the AC input terminal 24. The third acquirer 223 transmits the acquired current value and voltage value to the power failure determiner 224.

The power failure determiner 224 determines whether the power is supplied from the AC power source 10, on the basis of the AC power current value acquired by the third acquirer 223 from the AC-side current sensor 26 and the AC power voltage value acquired by the third acquirer 223 from the AC-side voltage sensor 27. After determining no power supply from the AC power source 10, the power failure determiner 224 determines occurrence of a power failure. Upon determining occurrence of a power failure of the AC power source 10, the power failure determiner 224 notifies the second acquirer 222, the third acquirer 223, the first determiner 225, and the rectifier controller 228 of the power failure. Upon determining recovery of the AC power source 10, the power failure determiner 224 notifies the second determiner 226 and the rectifier controller 228 of the power recovery.

In response to a stop of the AC power supply, the first determiner 225 determines whether the voltage value of the storage battery 40 is equal to or smaller than a first threshold. Specifically, the first determiner 225 determines, based on the voltage value of the storage battery 40 acquired by the first acquirer 221 from the storage battery monitoring unit 41, whether the voltage value of the storage battery 40 is equal to or smaller than the first threshold. After determining the voltage value of the storage battery 40 to be the first threshold or less, the first determiner 225 notifies the switcher 227 of the voltage value of the storage battery 40 being the first threshold or less.

The first threshold represents a predefined voltage value, and is, for example, set to a discharge cutoff voltage of the storage battery 40. If the storage battery 40 having the voltage value being the first threshold or less is continuously discharged, the storage battery 40 may become overdischarged. The first threshold takes different values depending on types of the storage battery 40.

After the AC power supply is resumed, the second determiner 226 determines, based on the voltage value of the storage battery 40 and the voltage value of the DC power output from the rectifier 21, whether a difference between the voltage of the storage battery 40 and the DC power voltage is equal to or smaller than a second threshold. More specifically, in response to a restart of the AC power supply and the open state of the switch 42, the second determiner 226 determines whether the difference between the voltage value of the storage battery 40 acquired by the first acquirer 221 and the DC power voltage acquired by the second acquirer 222 is equal to or smaller than the second threshold. After determining the difference between the voltage of the storage battery 40 and the DC power voltage as being the second threshold or less, the second determiner 226 notifies the switcher 227 of the difference between the voltage of the storage battery 40 and the DC power voltage being the second threshold or less.

Meanwhile, if the switch 42 is switched from the open state to the closed state while a large difference in voltage is occurring between the storage battery 40 and the DC power supplied to the storage battery 40, a greater inrush current may flow into the storage battery 40. As long as the voltage of the storage battery 40 and the voltage of the DC power supplied to the storage battery 40 match each other, no inrush current occurs. In the present embodiment, in the event of occurrence of an inrush current, the switch 42 may be placed in the closed state as long as the cables and else around the storage battery 40 have overcurrent resistance sufficient to withstand the magnitude of the inrush current. In the present embodiment, thus, the second threshold is set to a voltage difference at which the inrush current, occurring due to the switching of the switch 42 from the open state to the closed state, is within the magnitude that the overcurrent resistance of the cables around the storage battery 40 can withstand.

The switcher 227 controls the opening/closing of the switch 42 to disconnect or reconnect between the storage battery 40, and the rectifier 21 and the DC load 50. In the present embodiment, in response to the first determiner 225's determining the voltage of the storage battery 40 as being the first threshold or less, the switcher 227 switches the switch 42 to the open state to disconnect between the storage battery 40, and the rectifier 21 and the DC load 50. In response to the second determiner 226's determining the difference between the voltage of the storage battery 40 and the DC power voltage as being the second threshold or less, the switcher 227 switches the switch 42 to the closed state to reconnect the rectifier 21 to the storage battery 40.

The rectifier controller 228 serves to control the start and stop of the rectifier 21. The rectifier controller 228 controls the DC power voltage generated by the rectifier 21, that is, a predefined voltage. More specifically, after a power failure of the AC power source 10 is determined, the rectifier controller 228 stops the rectifier 21. After the power failure determiner 224 determines power recovery, that is, a restart of the AC power supply, the rectifier controller 228 starts and controls the rectifier 21 to set the voltage of the storage battery 40 acquired by the first acquirer 221 to a predefined voltage and generate DC power at the predefined voltage. After the power failure determiner 224 determines occurrence of a power failure, the rectifier controller 228 stops the rectifier 21. After the power failure determiner 224 determines end of the power failure, the rectifier controller 228 operates the rectifier 21 again. After recovery of the AC power supply and restart of the power supply to the voltage of the storage battery 40, the rectifier controller 228 controls the rectifier 21 to gradually increase the predefined voltage up to a float charging voltage.

The following will describe processing executed by the DC power supply device 20 configured as above in the present embodiment.

Figure 3B:
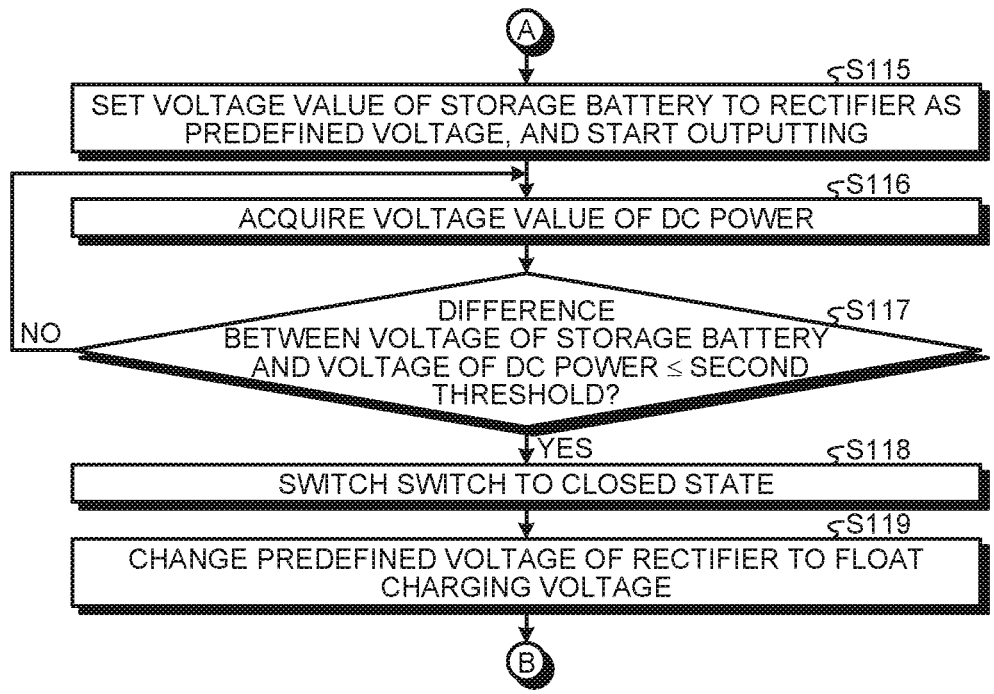

FIGS. 3A and 3B are a flowchart illustrating an example of processing executed by the DC power supply device 20 according to the present embodiment. It is assumed that at the start of the processing in the flowchart, a power failure has not occurred, and the DC load 50 is supplied with the DC power from the rectifier 21 and the storage battery 40 is float-charged with the DC power from the rectifier 21. At the start of the processing in the flowchart, the switch 42 is assumed to be in the closed state.

First, the third acquirer 223 acquires, from the AC-side current sensor 26 and the AC-side voltage sensor 27, a current value and a voltage value of AC power input from the AC input terminal 24 (S101). The third acquirer 223 transmits the acquired current value and voltage value to the power failure determiner 224.

Next, the power failure determiner 224 determines, based on the current value and the voltage value of AC power received from the third acquirer 223, occurrence or non-occurrence of a power failure of the AC power source 10 (S102).

After the power failure determiner 224 determines no occurrence of a power failure of the AC power source 10 ("No" at S102), the flow returns to the processing at S101.

After the power failure determiner 224 determines occurrence of a power failure of the AC power source 10 ("Yes" at S102), the rectifier controller 228 stops the rectifier 21 (S103). Stop of the rectifier 21 causes discharged DC power from the storage battery 40 to flow into the DC load 50, which starts the power supply from the storage battery 40 to the DC load 50. The power supply unit 23 also continues to operate with the discharged DC power from the storage battery 40. Thus, the storage battery monitoring unit 41 and the control unit 22 both continuously operate with the power supply from the power supply unit 23 during the power failure of the AC power source 10.

The third acquirer 223 acquires again, from the AC-side current sensor 26 and the AC-side voltage sensor 27, the current value and the voltage value of AC power input from the AC input terminal 24 (S104). The third acquirer 223 transmits the acquired current value and voltage value to the power failure determiner 224.

The power failure determiner 224 determines, based on the AC power current value and voltage value received from the third acquirer 223, whether the AC power source 10 has recovered (S105).

After the power failure determiner 224 determines no recovery of the AC power source 10 ("No" at S105), the first acquirer 221 acquires a voltage value of the storage battery 40 from the storage battery monitoring unit 41 (S106). The first acquirer 221 transmits the acquired voltage value of the storage battery 40 to the first determiner 225.

Next, the first determiner 225 receives the voltage value of the storage battery 40 from the first acquirer 221 to determine whether the voltage value is equal to or smaller than a first threshold (S107).

After the first determiner 225's determining the voltage value of the storage battery 40 to exceed the first threshold ("No" at S107), the processing from S104 to S107 is repeated. While the storage battery 40 is maintained at a larger voltage value than the first threshold, there is no possibility that the storage battery 40 may become overdischarged, so that the storage battery 40 continuously supplies the power to the DC load 50.

If the power failure determiner 224 determines recovery of the AC power source 10 while the storage battery 40 is maintained at a larger voltage value than the first threshold ("Yes" at S105), the rectifier controller 228 starts the rectifier 21 (S108). The flow then returns to the processing at S101.

After the first determiner 225 determines the voltage value of the storage battery 40 to be the first threshold or less at S107 ("Yes" at S107), the switcher 227 switches the switch 42 to the open state (S109). By the opening of the switch 42, the storage battery 40 is disconnected from the DC circuit 60. This interrupts the connection between the storage battery 40, and the rectifier 21 and the DC load 50, and stops the power supply from the storage battery 40 to the DC load 50. In addition, the storage battery 40 also stops the power supply to the power supply unit 23. Thus, the storage battery monitoring unit 41 and the control unit 22 are also stopped. This situation continues until the recovery of the AC power source 10.

Next, in response to the recovery of the AC power source 10 (S110), the power supply unit 23 starts with the AC power first (S111). Then, the power supply unit 23 supplies the power to the storage battery monitoring unit 41 and the control unit 22, to start the storage battery monitoring unit 41 and the control unit 22 (S112).

Next, the storage battery monitoring unit 41 acquires a voltage value of the storage battery 40 (S113). The storage battery monitoring unit 41 outputs the acquired voltage value to the control unit 22. The first acquirer 221 in the control unit 22 acquires the voltage value of the storage battery 40 from the storage battery monitoring unit 41. The first acquirer 221 transmits the acquired voltage value to the rectifier controller 228 and the second determiner 226.

Next, the rectifier controller 228 in the control unit 22 starts the rectifier 21 (S114). The rectifier controller 228 sets the voltage value of the storage battery 40 as a predefined voltage of the rectifier 21. After setting the predefined voltage, the rectifier controller 228 controls the rectifier 21 to start converting the AC power into DC power for output (S115). The rectifier 21 starts outputting the DC power to thereby resume the power supply to the DC load 50.

Next, the second acquirer 222 acquires from the DC-side voltage sensor 30 a voltage value of the DC power output from the rectifier 21 (S116). The second acquirer 222 transmits the acquired DC power voltage value to the second determiner 226.

The second determiner 226 determines, based on the voltage value of the storage battery 40 acquired by the first acquirer 221 and the DC power voltage value acquired by the second acquirer 222, whether a difference in voltage between the storage battery 40 and the DC power is equal to or smaller than a second threshold (S117).

After the second determiner 226 determines the difference in voltage between the storage battery 40 and the DC power as exceeding the second threshold ("No" at S117), the flow returns to the processing at S116. Immediately after start of the application of voltage to the DC circuit 60, for example, charging current to the storage battery 40 or the DC voltage and current control by the rectifier controller 228 may result in an inconstant difference between the voltage of the storage battery 40 and the DC power voltage measured by the DC-side voltage sensor 30. In such a case, the second acquirer 222 and the second determiner 226 wait for the voltage of the DC circuit 60 to stabilize while repeating the processing at S116 and S117.

After the second determiner 226 determines the difference in voltage between the storage battery 40 and the DC power as the second threshold or less ("Yes" at S117), the second determiner 226 notifies the switcher 227 of the voltage difference between the storage battery 40 and the DC power being the second threshold or less.

In response to receipt of the notification from the second determiner 226, the switcher 227 switches the switch 42 to the closed state (S118). The closing of the switch 42 causes from the rectifier 21 to the storage battery 40 to be reconnected, enabling the storage battery 40 to resume charging.

Next, the rectifier controller 228 varies the predefined voltage of the rectifier 21 to a float charging voltage while gradually increasing the predefined voltage (S119). The charging current of the storage battery 40 increases as the predefined voltage of the rectifier 21 increases. For example, the rectifier controller 228 may control the predefined voltage of the rectifier 21 to decrease if the current value thereof measured by the DC-side voltage sensor 30 exceeds a given limit value. In the flowchart the processing returns to the start and is repeated from S101.

As described above, the control unit 22 of the present embodiment interrupts the connection between the storage battery 40, and the rectifier 21 and the DC load 50 after the stop of the AC power supply and determining the voltage value of the storage battery 40 to be the first threshold or less. After determining the difference in voltage value between the storage battery 40 and the DC power to be the second threshold or less, the control unit 22 reconnects from the rectifier 21 to the storage battery 40. Thus, at the time of a power failure of the AC power source 10, the storage battery 40, and the rectifier 21 and the DC load 50 may be disconnected in order to prevent overdischarge of the storage battery 40. In such a case the control unit 22 of the present embodiment can decrease the inrush current applied to the storage battery 40 when reconnected to the rectifier 21 after power recovery. Consequently, the control unit 22 of the present embodiment can resume storing power in the storage battery 40 quickly after power recovery while preventing the storage battery 40 from overdischarging.

Conventionally, in order to prevent the inrush current from increasing at the time of resuming charging the storage battery 40 after power recovery, the worker may check the voltage of the storage battery and manually change the setting of the rectifier. Such manual work requires a time and may result in an error in the setting. In contrast, the control unit 22 of the present embodiment can automatically resume charging the storage battery 40 while decreasing the inrush current after power recovery, and hence can resume storing the power in the storage battery 40 quickly after power recovery. Power failure may intermittently occur multiple times. In view of this, the storage battery 40 can start charging quickly after power recovery to prepare for a next power failure.

After recovery of the AC power supply, the control unit 22 of the present embodiment controls the rectifier 21 to set the voltage of the storage battery 40 as a voltage of DC power to be generated by the rectifier 21. Thereby, the control unit 22 of the present embodiment can decrease the inrush current applied to the storage battery 40 by allowing the rectifier 21 to output the DC power at the same voltage as the voltage of the storage battery 40.

The DC power supply device 20 of the present embodiment includes the storage battery monitoring unit 41 in addition to the rectifier 21 and the control unit 22. After recovery of the AC power supply, the control unit 22 in the DC power supply device 20 controls the rectifier 21 to generate DC power at the same voltage as the voltage of the storage battery 40 measured by the storage battery monitoring unit 41. Thus, the DC power supply device 20 of the present embodiment can decrease the difference between the voltage of the storage battery 40 and the applied voltage to the storage battery 40 at the time of reconnecting the storage battery 40 to the rectifier 21 after the power recovery, thereby decreasing the inrush current to the storage battery 40.

Due to lower internal resistance of lithium-ion batteries, a greater inrush current is likely to flow into lithium-ion batteries than into lead-acid batteries. The control unit 22 of the present embodiment can decrease the inrush current that flows at the time of reconnecting the storage battery 40 to the rectifier 21 after recovery of the AC power source 10, and is therefore suitable for controlling the lithium-ion batteries. Lithium-ion batteries excel lead-acid batteries in terms of energy density, rapid charging performance, and long-lifetime characteristics. The DC power supply device 20 of the present embodiment thus adopts a lithium-ion battery as the storage battery 40 and can thereby improve the reliability of the power supply to the DC load 50.

The present embodiment describes, but is not limited to, an exemplary configuration of the DC power supply device 20. The elements of the DC power supply device 20 may not be placed in a single casing and may be included in individual casings to constitute a DC power supply system. For example, the switch 42, the storage battery 40, and the storage battery monitoring unit 41 may be located outside the DC power supply device 20.

Although in the present embodiment the control unit 22 controls the opening/closing of the switch 42, the storage battery monitoring unit 41 may control the opening/closing of the switch 42.

The present embodiment adopts the float charging system but the charging system is not limited thereto. Constant voltage charging may be employed, for example.

In the present embodiment, the first determiner 225 in the control unit 22 determines the possibility of overdischage of the storage battery 40 by determining based on the voltage of the storage battery 40 whether the voltage of the storage battery 40 is equal to or smaller than the first threshold. However, the way of determining the possibility of overdischarge is not limited thereto. For example, the first determiner 225 may determine the possibility of overdischarge of the storage battery 40 from voltages of individual storage battery cells of the storage battery 40 and the minimal voltages of the individual storage battery cells.

Second Embodiment

The first embodiment has described the DC power supply device 20 including one storage battery. In a second embodiment, the DC power supply device 20 includes a plurality of storage batteries 40.

Figure 4:
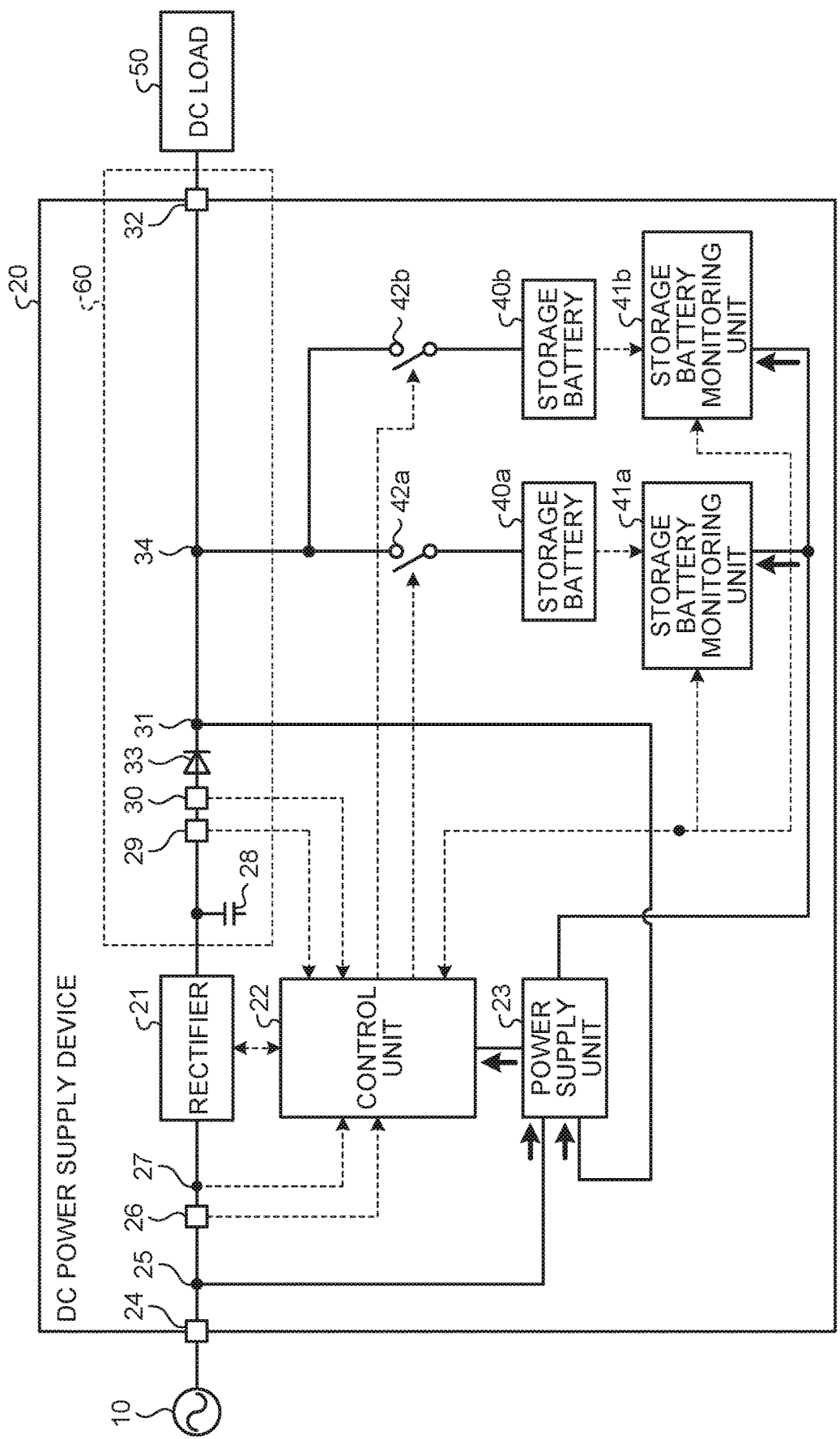
FIG. 4 is a diagram illustrating an exemplary overall configuration of a direct-current power supply device according to a second embodiment.

FIG. 4 is a diagram illustrating an exemplary overall configuration of the DC power supply device 20 according to the present embodiment. As illustrated in FIG. 4, the DC power supply device 20 of the present embodiment includes a rectifier 21, a control unit 22, a power supply unit 23, a first storage battery 40a, a second storage battery 40b, a first storage battery monitoring unit 41a, a second storage battery monitoring unit 41b, an AC input terminal 24, an AC-side current sensor 26, an AC-side voltage sensor 27, a capacitor 28, a DC-side current sensor 29, a DC-side voltage sensor 30, a DC output terminal 32, a diode 33, a first switch 42a, and a second switch 42b.

The first storage battery 40a and the second storage battery 40b may be collectively referred to as storage battery 40. The first storage battery monitoring unit 41a and the second storage battery monitoring unit 41b may be collectively referred to as storage battery monitoring unit 41. The first switch 42a and the second switch 42b may be collectively referred to as switch 42.

In the present embodiment the first storage battery 40a and the second storage battery 40b are connected in parallel.

The first storage battery monitoring unit 41a measures a voltage of the first storage battery 40a and outputs a result of the measurement to the control unit 22. The second storage battery monitoring unit 41b measures a voltage of the second storage battery 40b and outputs a result of the measurement to the control unit 22.

The first switch 42a is located between the first storage battery 40a, and the rectifier 21 and the DC load 51. More specifically, the first switch 42a is located between the DC circuit 60 and the first storage battery 40a.

The second switch 42b is located between the second storage battery 40b, and the rectifier 21 and the DC load 51. More specifically, the second switch 42b is located between the DC circuit 60 and the second storage battery 40b.

The first switch 42a and the second switch 42b are opened or closed in accordance with an instruction from the control unit 22 to connect or disconnect between the first storage battery 40a or the second storage battery 40b and the rectifier 21 and the DC load 51.

The following will describe functions of the control unit 22 in the present embodiment. As in the first embodiment, the control unit 22 in the present embodiment includes a first acquirer 221, a second acquirer 222, a third acquirer 223, a power failure determiner 224, a first determiner 225, a second determiner 226, a switcher 227, and a rectifier controller 228. The second acquirer 222, the third acquirer 223, and the power failure determiner 224 have the same or like functions as those in the first embodiment.

In addition to the functions described in the first embodiment, the first acquirer 221 of the present embodiment acquires a voltage value of the first storage battery 40a from the first storage battery monitoring unit 41a, and acquires a voltage value of the second storage battery 40b from the second storage battery monitoring unit 41b.

In addition to the functions described in the first embodiment, the first determiner 225 of the present embodiment determines whether the voltage value of the first storage battery 40a and the voltage value of the second storage battery 40b are equal to or smaller than a first threshold, in response to a stop of the AC power supply. Specifically, the first determiner 225 determines, on the basis of the voltage value of the first storage battery 40a acquired by the first acquirer 221 from the first storage battery monitoring unit 41a and the voltage value of the second storage battery 40b acquired by the first acquirer 221 from the second storage battery monitoring unit 41b, whether the voltage value of the first storage battery 40a and the voltage value of the second storage battery 40b are both equal to or smaller than the first threshold. After determining the voltage values of the first storage battery 40a and the second storage battery 40b as being the first threshold or less, the first determiner 225 notifies the switcher 227 of the voltage values of the first storage battery 40a and the second storage battery 40b being the first threshold or less.

In addition to the functions described in the first embodiment, the rectifier controller 228 of the present embodiment determines, in response to recovery of the AC power supply, whether the voltage value of the first storage battery 40a and the voltage value of the second storage battery 40b acquired by the first acquirer 221 are different from each other. After determining the voltage value of the first storage battery 40a and the voltage value of the second storage battery 40b as different from each other, the rectifier controller 228 sets the voltage value of the first storage battery 40a to the rectifier 21 as a voltage of DC power to be generated. After restart of charging the first storage battery 40a, the rectifier controller 228 sets the voltage value of the second storage battery 40b to the rectifier 21 as a voltage of DC power to be generated.

In addition to the functions described in the first embodiment, the second determiner 226 of the present embodiment determines, in response to recovery of the AC power supply, whether a difference between the voltage value of the first storage battery 40a acquired by the first acquirer 221 and the DC power voltage value acquired by the second acquirer 222 is equal to or smaller than a second threshold. After the closing of the first switch 42a, that is, after restart of charging the first storage battery 40a after power recovery, the second determiner 226 of the present embodiment determines whether a difference between the voltage value of the second storage battery 40b and the DC power voltage value is equal to or smaller than the second threshold.

In addition to the functions described in the first embodiment, the switcher 227 of the present embodiment places the first switch 42a in the closed state after the second determiner 226 determines the difference between the voltage value of the first storage battery 40a and the DC power voltage value to be the second threshold or less. In other words, after the second determiner 226 determines that the difference between the voltage value of the first storage battery 40a and the DC power voltage value is equal to or smaller than the second threshold, the switcher 227 allows the rectifier 21 to resume the DC power supply to the first storage battery 40a.

If the second determiner 226 determines that the difference between the voltage of the second storage battery 40b and the DC power voltage is the second threshold or less after the closing of the first switch 42a, the switcher 227 of the present embodiment places the second switch in the closed state. After restart of charging the first storage battery 40a and the second determiner 226 determines the difference between the voltage of the second storage battery 40b and the DC power voltage to be the second threshold or less, the switcher 227 allows the rectifier 21 to resume the DC power supply to the second storage battery 40b.

The following will describe processing executed by the DC power supply device 20 configured as above in the present embodiment.

Figure 5A:
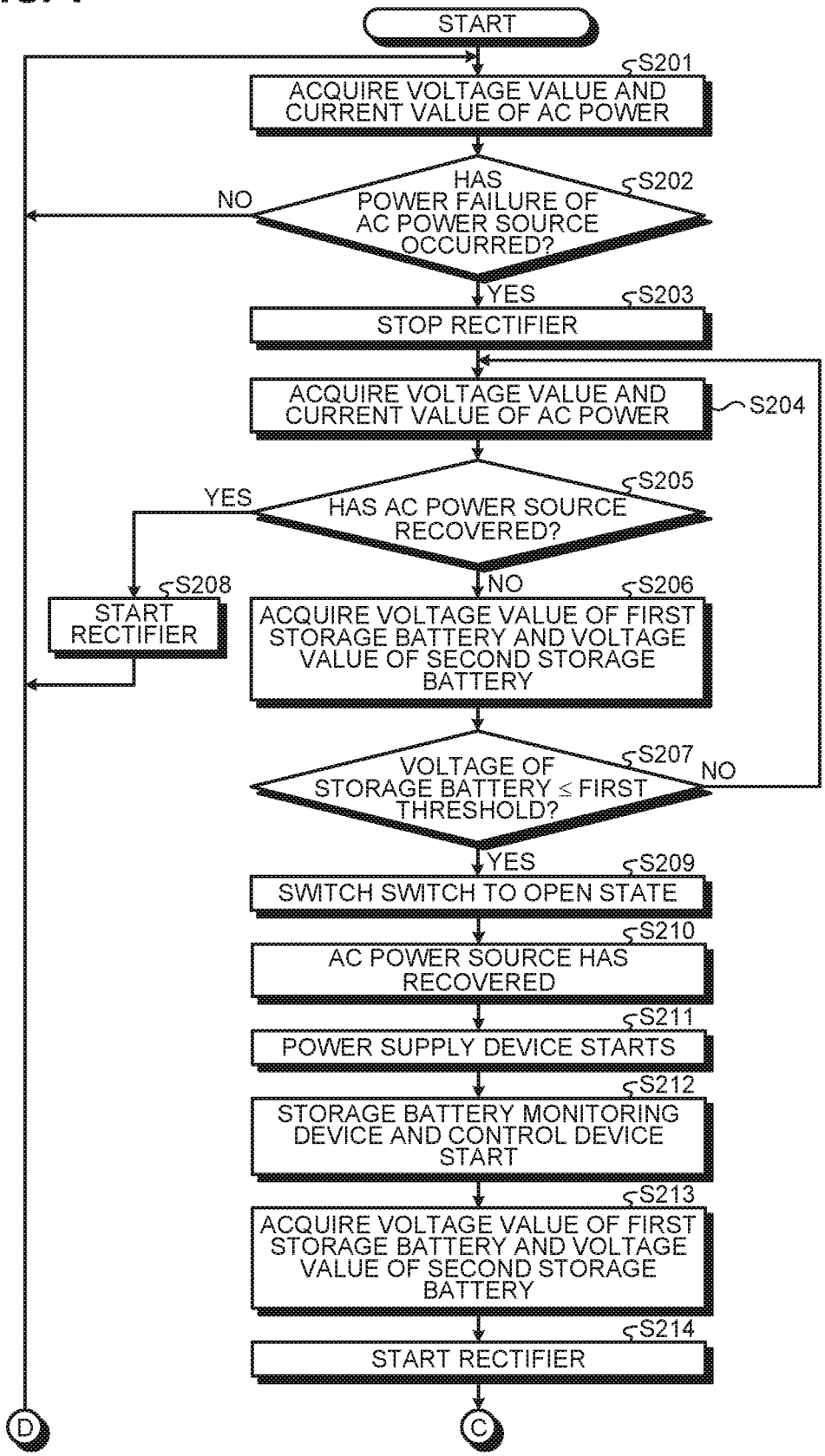
FIGS. 5A and 5B are a flowchart illustrating an example of processing executed by the direct-current power supply device according to the second embodiment.
Figure 5B:
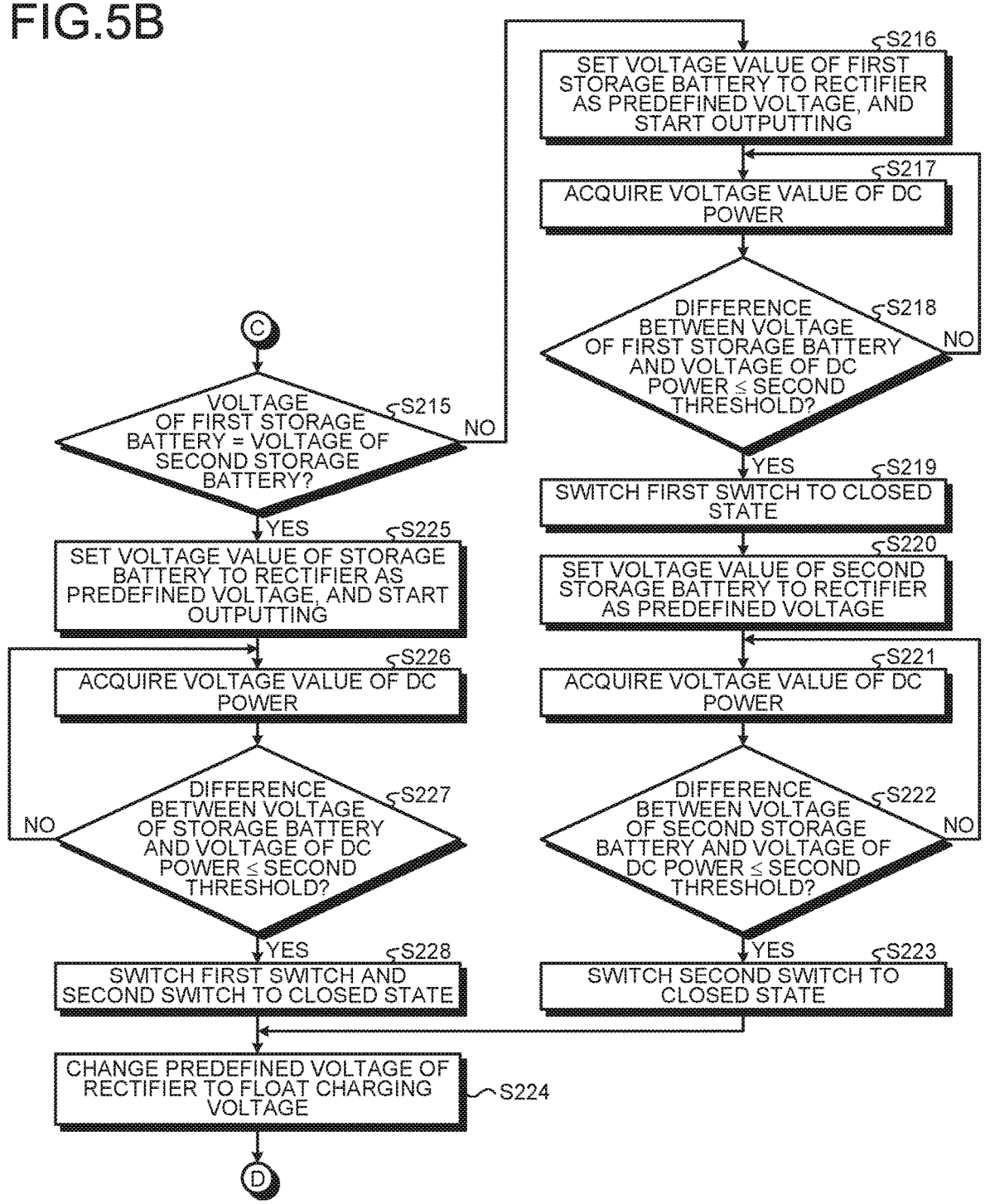

FIGS. 5A and 5B are a flowchart illustrating an example of processing executed by the DC power supply device 20 in the present embodiment. It is assumed that at the start of the processing in the flowchart, a power failure has not occurred, and the DC load 50 is supplied with the DC power from the rectifier 21, and the storage battery 40a and the storage battery 40b are float-charged with the DC power from the rectifier 21. At the start of the processing in the flowchart, the first switch 42a and the second switch 42b are assumed to be in the closed state.

The processing from S201 to S205, i.e., from acquiring the AC power voltage value and current value to determining whether the AC power source 10 has recovered, corresponds to the processing from S101 to S105 in the first embodiment with reference to FIGS. 3A and 3B. Startup of the rectifier 21 in S208 corresponds to the processing in S108 of the first embodiment.

After determining recovery or non-recovery of the AC power source 10 in S205, the first storage battery monitoring unit 41a acquires a voltage value of the first storage battery 40a. The second storage battery monitoring unit 41b acquires a voltage value of the second storage battery 40b (S206). The first storage battery monitoring unit 41a and the second storage battery monitoring unit 41b output the acquired voltage values to the control unit 22. The first acquirer 221 in the control unit 22 receives the voltage values of the first storage battery 40a and the second storage battery 40b from the first storage battery monitoring unit 41a and the second storage battery monitoring unit 41b. The first acquirer 221 transmits the acquired voltage values to the first determiner 225.

The first determiner 225 determines whether the voltage values of the first storage battery 40a and the second storage battery 40b are equal to or smaller than a first threshold (S207).

After the first determiner 225 determines the voltage values of the first storage battery 40a and the second storage battery 40b as exceeding the first threshold ("No" at S207), the processing from S204 to S207 is repeated.

After the first determiner 225 determines that the voltage values of the first storage battery 40a and the second storage battery 40b are the first threshold or less in S207 ("Yes" at S207), the switcher 227 switches the first switch 42a and the second switch 42b to the open state (S209). The processing from the power recovery of the AC power source 10 at S210 to the startup of the first storage battery monitoring unit 41a, the second storage battery monitoring unit 41b, and the control unit 22 at S212 corresponds to the processing from S110 to S112 in the first embodiment.

After startup of the first storage battery monitoring unit 41a, the second storage battery monitoring unit 41b, and the control unit 22 at S212, the first storage battery monitoring unit 41a acquires the voltage value of the first storage battery 40a. The second storage battery monitoring unit 41b acquires the voltage value of the second storage battery 40b (S213). The first storage battery monitoring unit 41a and the second storage battery monitoring unit 41b output the acquired voltage values to the control unit 22. The first acquirer 221 in the control unit 22 receives the voltage values of the first storage battery 40a and the second storage battery 40b from the first storage battery monitoring unit 41a and the second storage battery monitoring unit 41b. The first acquirer 221 transmits the acquired voltage values to the rectifier controller 228 and the second determiner 226.

Startup of the rectifier 21 at S214 corresponds to the processing at S114 in the first embodiment.

Next, the rectifier controller 228 in the control unit 22 determines, based on the voltage value of the first storage battery 40a and the voltage value of the second storage battery 40b acquired by the first acquirer 221, whether the first storage battery 40a and the second storage battery 40b differ in voltage from each other (S215).

After determining that the first storage battery 40a and the second storage battery 40b mutually differ in voltage ("No" at S215), the rectifier controller 228 sets the voltage value of the first storage battery 40a to the rectifier 21 as a predefined voltage of DC power to be generated. After setting the predefined voltage, the rectifier controller 228 controls the rectifier 21 to start converting AC power into DC power for output (S216). The power supply from the rectifier 21 to the DC load 50 is now resumed. Acquiring a DC power voltage value from the rectifier 21 at S217 corresponds to the processing at S106 in the first embodiment.

Next, the second determiner 226 determines, based on the voltage value of the first storage battery 40a acquired by the first acquirer 221 and the DC power voltage value acquired by the second acquirer 222, whether a difference between the voltage of the first storage battery 40a and the DC power voltage is equal to or smaller than a second threshold (S218).

After the second determiner 226 determines the difference between the voltage of the first storage battery 40a and the DC power voltage as exceeding the second threshold ("No" at S218), the flow returns to the processing at S217.

After determining the difference between the voltage of the first storage battery 40a and the DC power voltage as being the second threshold ("Yes" at S218) or less, the second determiner 226 notifies the switcher 227 of the difference between the voltage of the first storage battery 40a and the DC power voltage being the second threshold or less.

In response to receipt of the notification from the second determiner 226, the switcher 227 switches the first switch 42a to the closed state (S219). By the closing of the first switch 42a, from the rectifier 21 to the first storage battery 40a is reconnected to resume the charging of the first storage battery 40a.

Next, the rectifier controller 228 sets the voltage value of the second storage battery 40b to the rectifier 21 as a predefined voltage of DC power to be generated (S220).

Next, the second acquirer 222 acquires, from the DC-side voltage sensor 30, the voltage value of DC power output from the rectifier 21 (S221). The second acquirer 222 transmits the acquired DC power voltage value to the first determiner 225.

The second determiner 226 determines, based on the voltage value of the second storage battery 40b acquired by the first acquirer 221 and the DC power voltage value acquired by the second acquirer 222, whether a difference between the voltage of the second storage battery 40b and the DC power voltage is equal to or smaller than a second threshold (S222).

After the second determiner 226 determines the difference between the voltage of the second storage battery 40b and the DC power voltage as exceeding the second threshold ("No" at S222), the flow returns to the processing at S221.

After determining the difference between the voltage of the second storage battery 40b and the DC power voltage as being the second threshold or less ("Yes" at S222), the second determiner 226 notifies the switcher 227 of the difference between the voltage of the second storage battery 40b and the DC power voltage as being the second threshold or less.

In response to receipt of the notification from the second determiner 226, the switcher 227 switches the second switch 42b to the closed state (S223). By the closing of the second switch 42b, from the rectifier 21 to the second storage battery 40b are reconnected to resume charging the second storage battery 40b.

Next, the rectifier controller 228 varies the predefined voltage of the rectifier 21 to a float charging voltage while gradually increasing the predefined voltage (S224). Then, returning to the start of the flowchart, the processing is repeated from S201.

After determining that the first storage battery 40a and the second storage battery 40b match in voltage each other at S215 ("Yes" at S215), the rectifier controller 228 sets the same voltage value of the first storage battery 40a and the second storage battery 40b (hereinafter, the same voltage value of the first storage battery 40a and the second storage battery 40b are simply referred to as "voltage value of storage battery 40") to the rectifier 21 as a predefined voltage of DC power to be generated. After setting the predefined voltage, the rectifier controller 228 controls the rectifier 21 to start converting AC power into DC power for output (S225).

Acquiring the voltage value of DC power output from the rectifier 21 at S226 and determining whether the difference in voltage between the storage battery 40 and the DC power is equal to or smaller than the second threshold at S227 correspond to the processing at S116 and S117 in the first embodiment.

After determining the difference in voltage between the storage battery 40 and the DC power as being the second threshold or less ("Yes" at S227), the second determiner 226 notifies the switcher 227 of the difference in voltage between the storage battery 40 and the DC power being the second threshold or less.

In response to receipt of the notification from the second determiner 226, the switcher 227 switches the first switch 42a and the second switch 42b to the closed state (S228). By the closing of the first switch 42a and the second switch 42b, from the rectifier 21 to the first storage battery 40a and the second storage battery 40b are reconnected to charge the first storage battery 40a and the second storage battery 40b. After S228, the flow proceeds to the processing at S224.

As described above, in the DC power supply device 20 of the present embodiment, after determining that the first storage battery 40a and the second storage battery 40b mutually differ in voltage value, the control unit 22 sets the voltage value of the first storage battery 40a to the rectifier 21 as a voltage of DC power to be generated by the rectifier 21. In response to restart of charging the first storage battery 40a, the control unit 22 sets the voltage of the second storage battery 40b to the rectifier 21 as a voltage of DC power to be generated by the rectifier 21. Thus, in addition to the effects of the first embodiment, the DC power supply device 20 of the present embodiment including multiple storage batteries 40 can decrease inrush current at the time of resuming charging each of the storage batteries 40. Consequently, the DC power supply device 20 of the present embodiment can resume charging the storage batteries 40 quickly after recovery of the AC power source 10.

In the present embodiment, the DC power supply device 20 includes the two storage batteries 40, however, the number of the storage batteries 40 is not limited thereto.

Third Embodiment

In the first and second embodiments, one switch 42 is provided for one storage battery 40. In contrast, in a third embodiment, two switches are provided for one storage battery 40.

Figure 6:
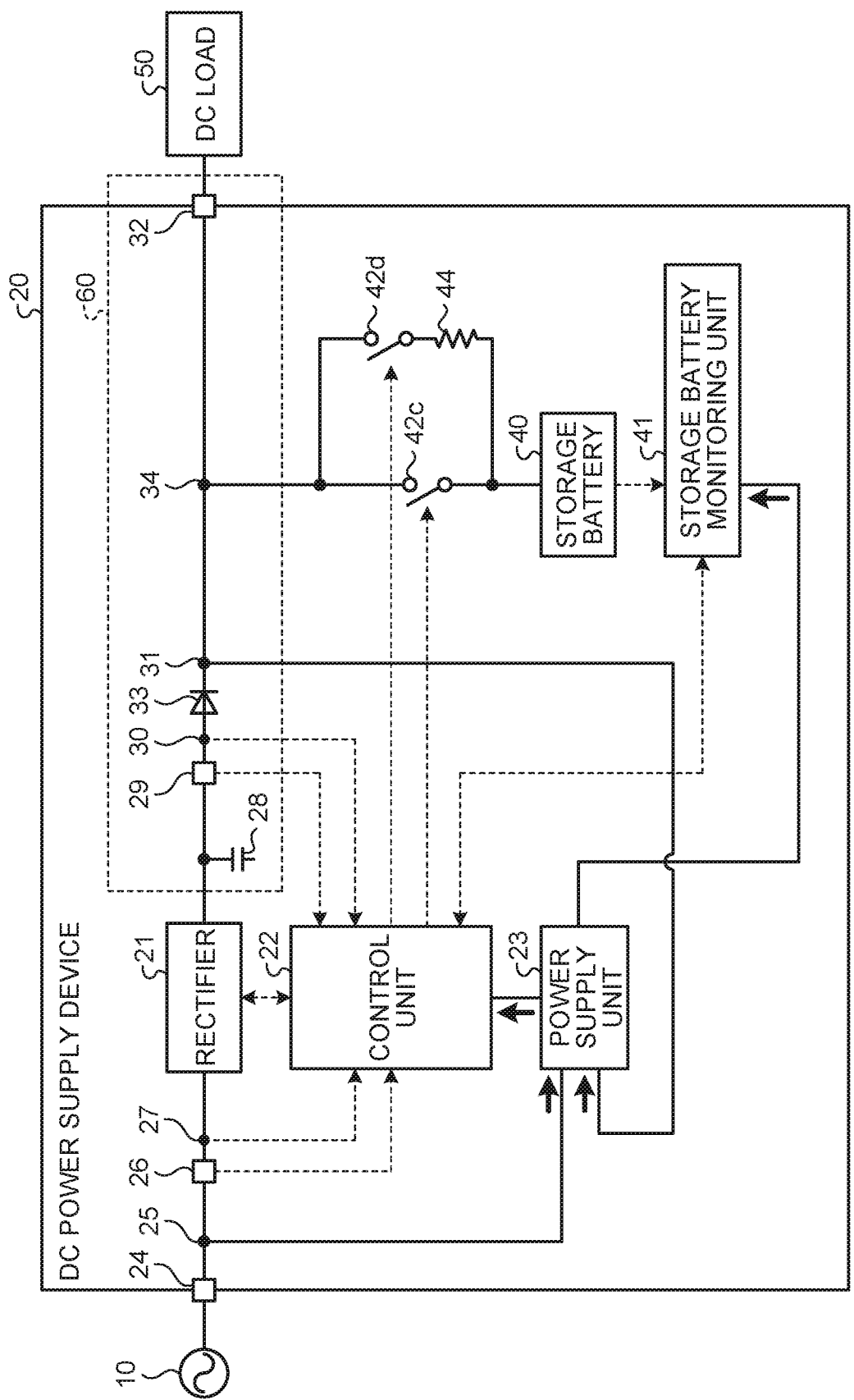
FIG. 6 is a diagram illustrating an exemplary overall configuration of a direct-current power supply device according to a third embodiment.

FIG. 6 is a diagram illustrating an exemplary overall configuration of a DC power supply device 20 according to the present embodiment. As illustrated in FIG. 6, the DC power supply device 20 of the present embodiment includes a rectifier 21, a control unit 22, a power supply unit 23, a storage battery 40, a storage battery monitoring unit 41, an AC input terminal 24, an AC-side current sensor 26, an AC-side voltage sensor 27, a capacitor 28, a DC-side current sensor 29, a DC-side voltage sensor 30, a DC output terminal 32, a diode 33, a direct coupling-side switch 42c, a resistor-side switch 42d, and a resistor 44.

The direct coupling-side switch 42c is located between the storage battery 40, and the rectifier 21 and a DC load 50. More specifically, the direct coupling-side switch 42c is located between a DC circuit 60 and the storage battery 40 and is directly coupled to the storage battery 40 without the resistor 44. The direct coupling-side switch 42c is placed in parallel to the resistor-side switch 42d and the resistor 44. The direct coupling-side switch 42c is normally placed in the closed state. The direct coupling-side switch 42c is an exemplary first switch of the present embodiment.

The resistor-side switch 42d is placed between the storage battery 40, and the rectifier 21 and the DC load 50 in parallel to the direct coupling-side switch 42c. The resistor-side switch 42d is placed in series to the resistor 44. In the present embodiment, as illustrated in FIG. 6, the resistor-side switch 42d is located between the DC circuit 60 and the storage battery 40. The resistor 44 is located between the resistor-side switch 42d and the storage battery 40. The resistor-side switch 42d is normally placed in the open state. The resistor-side switch 42d is an exemplary second switch in the present embodiment.

The resistor 44 is placed in parallel to the direct coupling-side switch 42c and in series to the resistor-side switch 42d. The resistor 44 may be either a fixed resistor or a variable resistor.

The following will describe functions of the control unit 22 in the present embodiment. As in the first embodiment, the control unit 22 of the present embodiment includes a first acquirer 221, a second acquirer 222, a third acquirer 223, a power failure determiner 224, a first determiner 225, a second determiner 226, a switcher 227, and a rectifier controller 228. The first acquirer 221, the second acquirer 222, the third acquirer 223, the power failure determiner 224, the first determiner 225, and the second determiner 226 include the same or like functions as those of the first embodiment.

In addition to the functions in the first embodiment, in response to recovery of the AC power supply, the rectifier controller 228 of the present embodiment sets a predefined float charging voltage to the rectifier 21 as a predefined voltage of DC power to be generated.

In addition to the functions in the first embodiment, the switcher 227 of the present embodiment places the direct coupling-side switch 42c and the resistor-side switch 42d in the open state after the first determiner 225 determines the voltage of the storage battery 40 as being the first threshold or less.

After the rectifier controller 228 sets the float charging voltage to the rectifier 21 as a voltage of DC power to be generated after restart of the AC power supply, the switcher 227 places the resistor-side switch 42d in the closed state.

If the second determiner 226 determines the difference between the voltage of the storage battery 40 and the DC power voltage as being the second threshold or less after the closing of the resistor-side switch 42d, the switcher 227 places the direct coupling-side switch 42c in the closed state.

The following will describe processing executed by the DC power supply device 20 configured as above in the present embodiment.

Figure 7A:
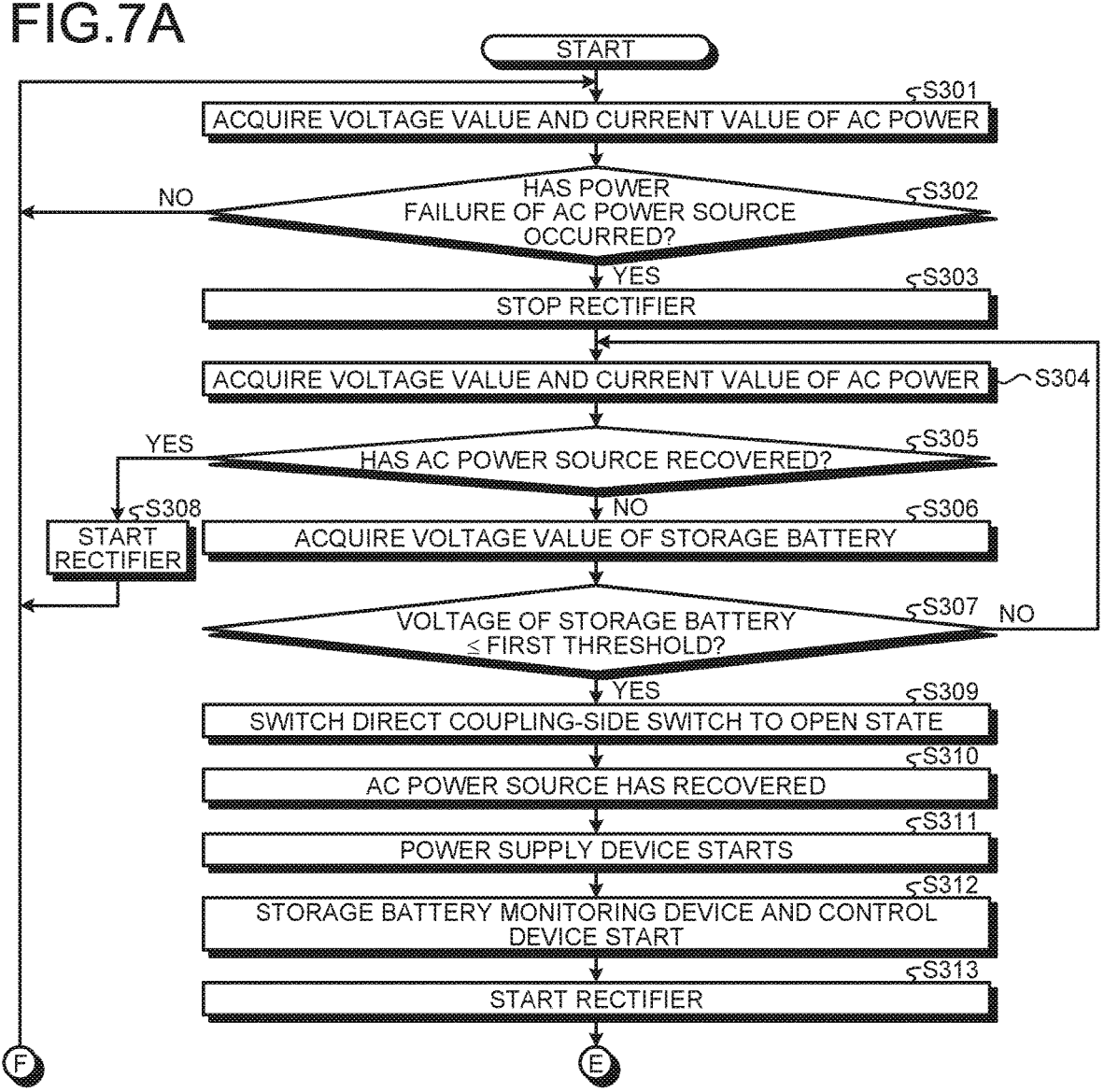
FIGS. 7A and 7B are a flowchart illustrating an example of processing executed by the direct-current power supply device according to the third embodiment.
Figure 7B:
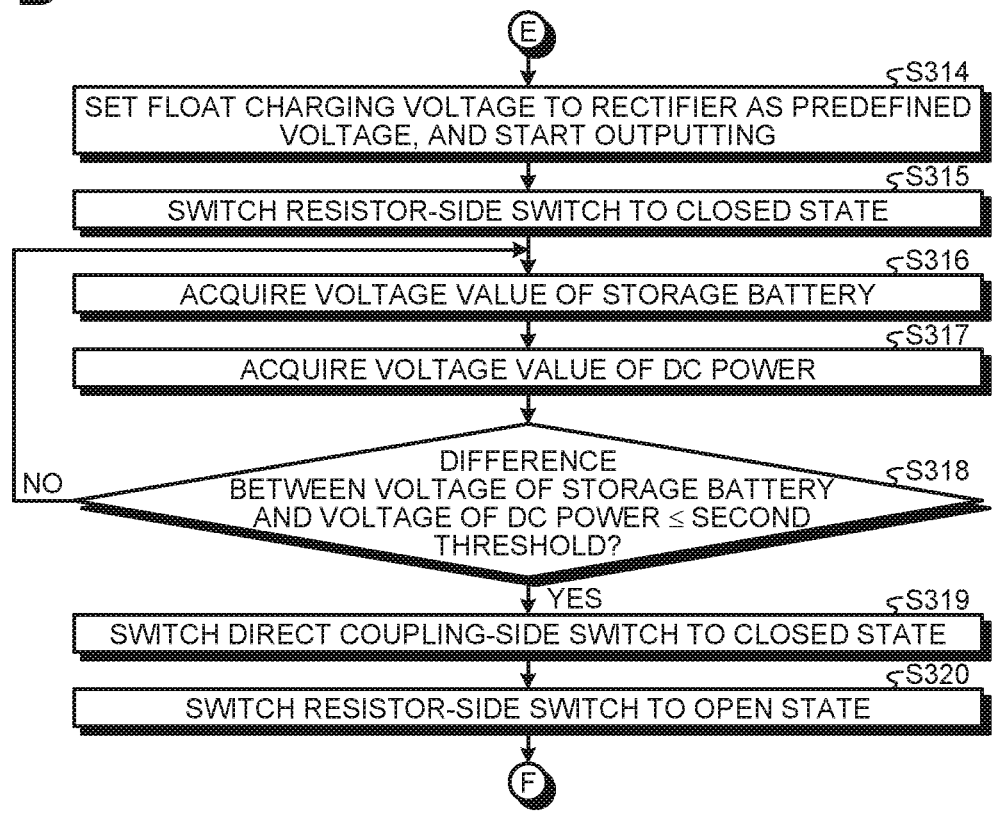

FIGS. 7A and 7B are a flowchart illustrating processing executed by the DC power supply device 20 according to the present embodiment. It is assumed that at the start of the processing in the flowchart, a power failure has not occurred, and the DC load 50 is supplied with the DC power from the rectifier 21 and the storage battery 40 is float-charged with the DC power from the rectifier 21. At the start of the processing in the flowchart, the direct coupling-side switch 42c is assumed to be placed in the closed state and the resistor-side switch 42d to be placed in the open state. In other words, at the time of the start of the processing in the flowchart, the storage battery 40 is supplied with the DC power output from the rectifier 21 through the direct coupling-side switch 42c.

The processing from S301 to S307, i.e., acquiring the AC power voltage value and current value to determining whether the voltage value of the storage battery 40 is equal to or smaller than a first threshold corresponds to the processing from S101 to S107 in the first embodiment with reference to FIGS. 3A and 3B. Startup of the rectifier 21 at S308 corresponds to the processing at S108 in the first embodiment.

After the first determiner 225 determines the voltage value of the storage battery 40 as being the first threshold or less ("Yes" at S307), the switcher 227 of the present embodiment switches the direct coupling-side switch 42c to the open state (S309). The resistor-side switch 42d is also placed in the open state as described above, therefore, the storage battery 40 and the DC circuit 60 are now disconnected.

The power recovery of the AC power source 10 at S310 to the startup of the storage battery monitoring unit 41 and the control unit 22 at S312 correspond to the processing from S110 to S112 in the first embodiment with reference to FIGS. 3A and 3B. Startup of the rectifier 21 at S313 corresponds to the processing at S114 in the first embodiment.

The rectifier controller 228 of the present embodiment starts the rectifier 21 and sets the float charging voltage as a predefined voltage, and controls the rectifier 21 to start converting AC power into DC power for output (S314).

Next, the switcher 227 of the present embodiment switches the resistor-side switch 42d to the closed state (S315). By the closing of the resistor-side switch 42d, charging of the storage battery 40 is resumed. In the present embodiment, to resume charging the storage battery 40 after power recovery, the storage battery 40 is supplied with the power from the rectifier 21 through the resistor 44, which can decrease the inrush current irrespective of a difference between the float charging voltage and the voltage of the storage battery 40.

Next, the storage battery monitoring unit 41 acquires a voltage value of the storage battery 40 (S316). The storage battery monitoring unit 41 outputs the acquired voltage value to the control unit 22. The first acquirer 221 in the control unit 22 receives the voltage value of the storage battery 40 from the storage battery monitoring unit 41. The first acquirer 221 transmits the acquired voltage value to the rectifier controller 228 and the second determiner 226.

The processing at S317 and S318, i.e., acquiring the DC power voltage value and determining whether the difference between the voltage of the storage battery 40 and the DC power voltage is equal to or smaller than the second threshold, corresponds to the processing S116 and S117 in the first embodiment.

After the second determiner 226 determines the difference between the voltage of the storage battery 40 and the DC power voltage as exceeding the second threshold ("No" at S318), the flow returns to the processing at S316. The control unit 22 repeats the processing from S316 to S318 until the storage battery 40 is charged and the difference between the voltage of the storage battery 40 and the DC power voltage falls to the second threshold or less.

After determining the difference between the voltage of the storage battery 40 and the DC power voltage as being the second threshold or less ("Yes" at S318), the second determiner 226 notifies the switcher 227 of the difference between the voltage of the storage battery 40 and the DC power voltage being the second threshold or less.

In response to receipt of the notification from the second determiner 226, the switcher 227 switches the direct coupling-side switch 42c to the closed state (S319). By the closing of the direct coupling-side switch 42c, the storage battery 40 is supplied with the power from the rectifier 21 without the resistor 44. This can improve the charging speed of the storage battery 40.

The switcher 227 switches the resistor-side switch 42d to the open state after placing the direct coupling-side switch 42c in the closed state (S320). Then, returning to the start of the flowchart, the processing is repeated from S301.

As described above, the DC power supply device 20 of the present embodiment includes the direct coupling-side switch 42c, the resistor-side switch 42d, and the resistor 44. The DC power supply device 20 places the direct coupling-side switch 42c and the resistor-side switch 42d in the open state after determining the voltage value of the storage battery 40 as being the first threshold or less, places the resistor-side switch 42d in the closed state in response to recovery of the AC power supply, and places the direct coupling-side switch 42c in the closed state after determining the difference between the voltage value of the storage battery 40 and the DC power voltage value as being the second threshold or less. Thus, in addition to the effects of the first embodiment, the DC power supply device 20 of the present embodiment can decrease the inrush current owing to the resistor 44 at the time of restart of charging the storage battery 40 after the power recovery. The DC power supply device 20 of the present embodiment can resume charging the storage battery 40 without varying the predefined voltage of the rectifier 21 from the float charging voltage, which enables simplification of the processing by the control unit 22.

In the case of using a variable resistor for the resistor 44, the control unit 22 or the storage battery monitoring unit 41 may vary the resistance value of the resistor 44. For example, the control unit 22 having a function of controlling the resistor 44 may gradually decrease the resistance value of the resistor 44 after the resistor-side switch 42d is placed in the closed state. The DC power supply device 20 adopting such a configuration can charge the storage battery 40 more quickly. Instead of the resistor 44, a variable capacitor may be adoptable, for example.

Fourth Embodiment

In the first to third embodiments, the power supply path to the storage battery 40 and the power discharge path from the storage battery 40 are common. In a fourth embodiment, the charging path and the discharging path are separately set.

Figure 8:
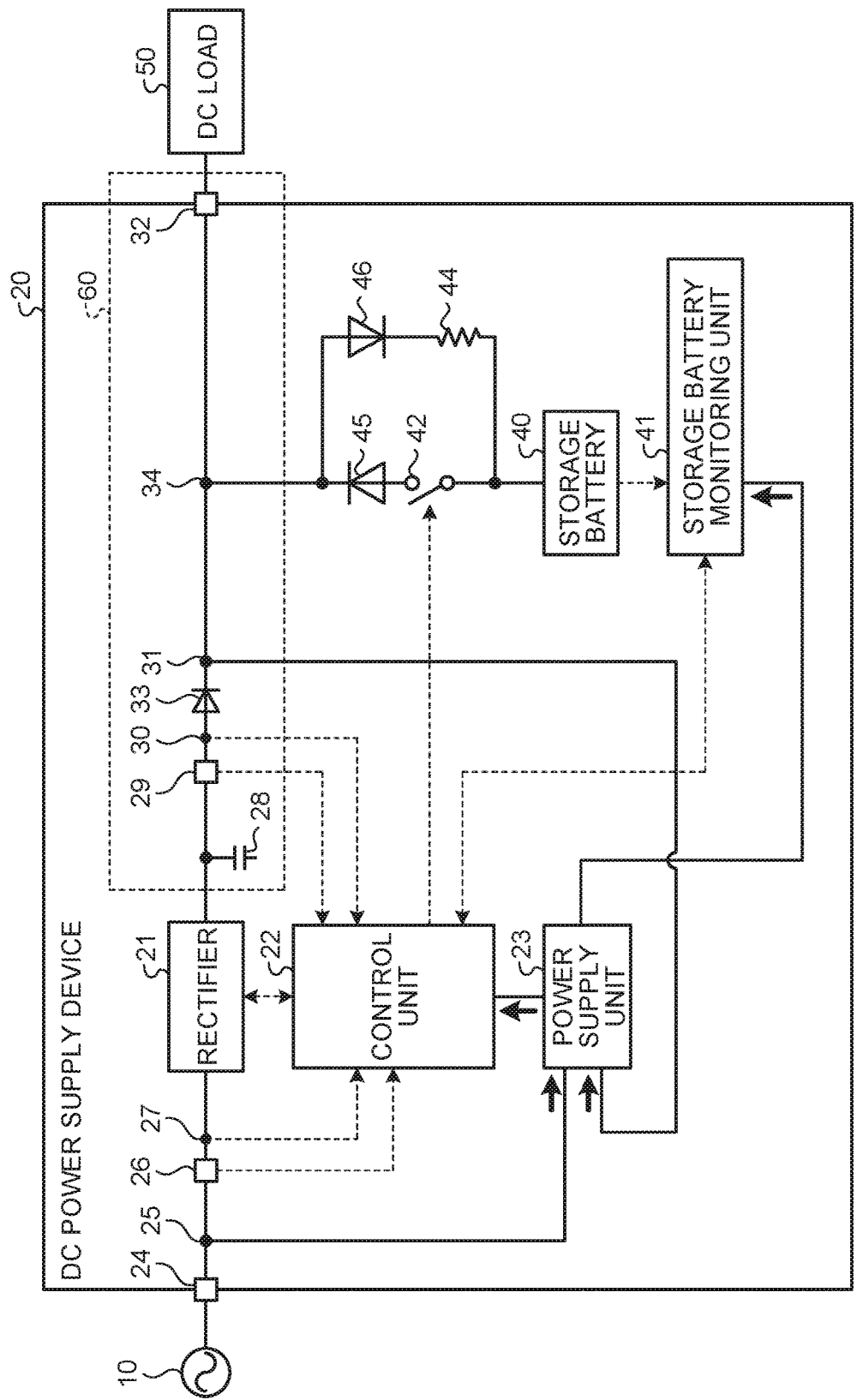
FIG. 8 is a diagram illustrating an exemplary overall configuration of a direct-current power supply device according to a fourth embodiment.

FIG. 8 is a diagram illustrating an exemplary overall configuration of a DC power supply device 20 according to the present embodiment. As illustrated in FIG. 8, the DC power supply device 20 of the present embodiment includes a rectifier 21, a control unit 22, a power supply unit 23, a storage battery 40, a storage battery monitoring unit 41, an AC input terminal 24, an AC-side current sensor 26, an AC-side voltage sensor 27, a capacitor 28, a DC-side current sensor 29, a DC-side voltage sensor 30, a DC output terminal 32, a diode 33, a switch 42, a resistor 44, a discharging diode 45, and a charging diode 46.

The resistor 44 is placed in series to the charging diode 46 and in parallel to the discharging diode 45 and the switch 42. In the present embodiment, the resistor 44 is located between the charging diode 46 and the storage battery 40. As in the third embodiment, the resistor 44 may be either a fixed resistor or a variable resistor.

The discharging diode 45 is placed in series to the switch 42. More specifically, the discharging diode 45 is located between the switch 42 and a DC circuit 60. The discharging diode 45 functions as an anti-backflow diode that prevents the current from flowing backward to the storage battery 40 from the DC circuit 60. In the present embodiment, the discharging diode 45 allows a current discharged from the storage battery 40 to flow, and prevents a current output from the rectifier 21 from flowing.

The charging diode 46 is placed in parallel to the discharging diode 45. More specifically, the charging diode 46 is located between the resistor 44 and the DC circuit 60. The charging diode 46 functions as an anti-backflow diode that prevents the current from flowing backward from the storage battery 40 to the DC circuit 60. In the present embodiment, the charging diode 46 prevents the current discharged from the storage battery 40 from flowing, and allows the current output from the rectifier 21 to flow.

In the present embodiment, a path connecting the DC circuit 60 and the storage battery 40 through the discharging diode 45 and the switch 42 is referred to as "discharging path". A path connecting the DC circuit 60 and the storage battery 40 through the charging diode 46 and the resistor 44 is referred to as "charging path". In the present embodiment, the charging path is provided with no switch. Thus, the storage battery 40 is constantly connected to the DC circuit 60 through the charging diode 46 and the resistor 44, however, the charging diode 46 serves to prevent the current backflow, so that the storage battery 40 discharges no current to the DC circuit 60 in the charging path except for a minute leak current.

The switch 42 of the present embodiment includes the same or like functions as that of the first embodiment and is placed between the storage battery 40 and the discharging diode 45. The switch 42 is normally placed in the closed state.

The following will describe functions of the control unit 22 in the present embodiment. As in the first embodiment, the control unit 22 of the present embodiment includes a first acquirer 221, a second acquirer 222, a third acquirer 223, a power failure determiner 224, a first determiner 225, a second determiner 226, a switcher 227, and a rectifier controller 228. The first acquirer 221, the second acquirer 222, the third acquirer 223, the power failure determiner 224, the first determiner 225, and the second determiner 226 include the same or like functions as those of the first embodiment.

In addition to the functions in the first embodiment, the rectifier controller 228 of the present embodiment sets a predefined float charging voltage to the rectifier 21 as a predefined voltage of DC power to be generated by the rectifier 21, in response to a restart of the AC power supply.

In addition to the functions in the first embodiment, the switcher 227 of the present embodiment places the switch 42 in the open state after the first determiner 225 determines the voltage of the storage battery 40 as being the first threshold or less.

After the AC power supply is resumed, the switcher 227 places the switch 42 in the closed state when the rectifier controller 228 sets the float charging voltage to the rectifier 21 as a voltage of DC power to be generated.

The following will describe processing executed by the DC power supply device 20 as configured above in the present embodiment.

Figure 9B:
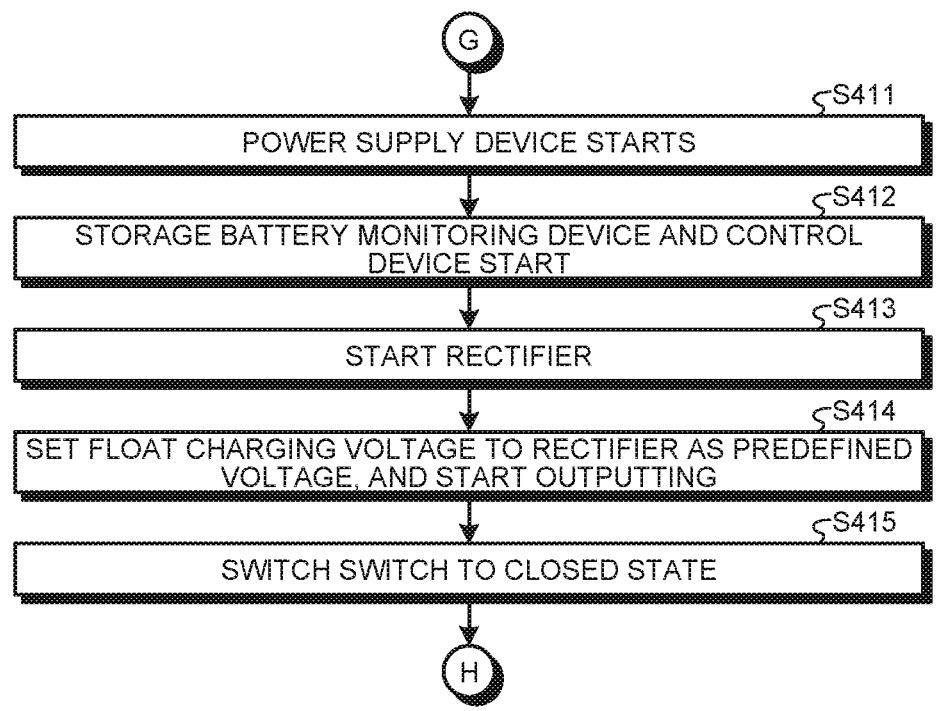

FIG. 9 is a flowchart illustrating an example of processing executed by the DC power supply device 20 according to the present embodiment. It is assumed that at the time of start of the processing in the flowchart, a power failure has not occurred, and the DC load 50 is supplied with DC power output from the rectifier 21 and the storage battery 40 is float-charged with the DC power. It is also assumed that at the time of start of the processing in the flowchart, the switch 42 is placed in the closed state so that the storage battery 40 can discharge power to the DC circuit 60 through the switch 42 and the discharging diode 45.

The processing from S401 to S412, i.e., acquiring the AC power voltage value and current value to startup of the storage battery monitoring unit 41 and the control unit 22 corresponds to the processing at S101 to S112 in the first embodiment with reference to FIGS. 3A and 3B. The startup of the rectifier 21 S413 and setting a float charging voltage to the rectifier 21 as a predefined voltage to start outputting at S414 correspond to the processing at S313 and S314 in the third embodiment with reference to FIGS. 7A and 7B. After S414, the switcher 22 places the switch 42 in the closed state (S415).

The rectifier controller 228 controls the rectifier 21 to resume DC power supply to supply the power to the storage battery 40 through the charging diode 46 and the resistor 44.

As described above, the DC power supply device 20 of the present embodiment includes the discharging diode 45 placed in series to the switch 42 and the charging diode 46 placed in series to the resistor 44. The control unit 22 of the DC power supply device 20 places the switch 42 in the open state after determining the voltage of the storage battery 40 as being the first threshold or less, and sets the predefined float charging voltage to the rectifier 21 as a DC power voltage to be generated by the rectifier 21 in response to a restart of the AC power supply to place the switch 42 in the closed state. Thus, the DC power supply device 20 of the present embodiment can further shorten the time taken from the power recovery of the AC power source 10 to the start of charging the storage battery 40, in addition to the effects of the first embodiment.

As in the third embodiment, in the case of using a variable resistor for the resistor 44, the control unit 22 or the storage battery monitoring unit 41 may vary the resistance value of the resistor 44. For example, the control unit 22 having a function of controlling the resistor 44 may gradually decrease the resistance value of the resistor 44 after recovery of the AC power source 10. The DC power supply device 20 adopting such a configuration can more quickly charge the storage battery 40.

Modification

In the third and fourth embodiments the DC power supply device 20 may include a plurality of storage batteries 40 as in the second embodiment.

For example, the storage battery 40, the storage battery monitoring unit 41, the direct coupling-side switch 42c, the resistor-side switch 42d, and the resistor 44 in the third embodiment may be formed as a single storage battery management module. The DC power supply device 20 may include two or more sets of such storage battery management modules. In this case, the storage battery management modules are connected in parallel.

In the fourth embodiment, the storage battery 40, the storage battery monitoring unit 41, the switch 42, the resistor 44, the discharging diode 45, and the charging diode 46 may be formed as a single storage battery management module. The DC power supply device 20 may include two or more sets of such storage battery management modules.

As described above, according to the first to fourth embodiments, it is possible to quickly resume storing power in the storage battery 40 after power recovery while preventing overdischarge of the storage battery 40.

Computer programs executed by the control units 22 in the first to fourth embodiments are incorporated and provided in a ROM or the like. The computer programs executed by the control units 22 in the first to fourth embodiments may be recorded and provided in an installable or executable file format on a computer-readable recording medium such as a CD-ROM, a flexible disk (FD), a CD-R, and a digital versatile disc (DVD).

Furthermore, the computer programs executed by the control units 22 in the first to fourth embodiments may be stored on a computer connected to a network such as the Internet and provided by being downloaded through the network. The computer programs executed by the control units 22 in the first to fourth embodiments may be provided or distributed through a network such as the Internet.

The computer programs executed by the control units 22 in the first to fourth embodiments have a module configuration including the above-mentioned elements (first acquirer, second acquirer, third acquirer, power failure determiner, first determiner, second determiner, switcher, and rectifier controller). As actual hardware, a CPU (processor) reads and executes a computer program from the ROM to load the respective elements on a main storage device and generate the first acquirer, the second acquirer, the third acquirer, the power failure determiner, the first determiner, the second determiner, the switcher, and the rectifier controller on the main storage device.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes may be made without departing from the spirit of the inventions. The accompanying claims and their equivalents are intended to cover such embodiments or modifications as would fall within the scope and spirit of the inventions.

The invention claimed is:

1. A charging and discharging control device comprising one or more processors configured to:
   determine, in response to a stop of alternate-current power supply operation, whether a first voltage value is equal to or smaller than a first threshold, the storage battery being capable of supplying power to a direct-current load, the first voltage value being a voltage value of a storage battery;
   determine, in response to a restart of the alternate-current power supply operation, whether a difference between the first voltage and a second voltage value output from a rectifier is equal to or smaller than a second threshold, the rectifier converting the alternate-current power into direct-current power for supply to the direct-current load and the storage battery, the second voltage value being a voltage value of direct-current power; and
   disconnect the storage battery from the rectifier and from the direct-current load, when determining that the first voltage value is equal to or smaller than the first threshold, and
   reconnect the rectifier to the storage battery when determining that the difference between the first voltage value and the second voltage value is equal to or smaller than the second threshold.

2. The charging and discharging control device according to claim 1, wherein
   the first voltage value at the time of the restart of the alternate-current power supply is less than the voltage value of the direct-current power output from the rectifier before the stop of the alternate -current power supply.

3. The charging and discharging control device according to claim 1, further comprising:
   a capacitor connected to an output side of the rectifier; and
   a diode connected between the capacitor and the storage battery, the diode preventing a current discharged from the storage battery from flowing to the rectifier.

4. The charging and discharging control device according to claim 1, wherein
   the one or more processors are further configured to control, in response to the restart of the alternate-current power supply, the rectifier to set the first voltage value as a voltage of the direct-current power to be generated by the rectifier.

5. The charging and discharging control device according to claim 1,
   the one or more processors are further configured to control, in response to the restart of the alternate-current power supply, the rectifier to set a predefined float charging voltage as a voltage of direct-current power to be generated by the rectifier.

6. The charging and discharging control device according to claim 1, wherein
   the one or more processors are further configured to control opening and closing of a switch, to disconnect or reconnect between the storage battery, and the rectifier and the direct-current load, the switch connected between the storage battery, and the rectifier and the direct-current load.

7. A direct-current power supply system comprising:
   a rectifier to be supplied with alternate-current power from an alternate-current power source, to convert the alternate-current power into direct-current power for output to a direct-current load and a storage battery; and
   a charging and discharging control device comprises one or more processors configured to:
     determine, in response to a stop of the alternate-current power supply operation, whether a first voltage value is equal to or smaller than a first threshold, the storage battery being capable of supplying power to the direct-current load, the first voltage value being a voltage value of a storage battery;
     determine, in response to a restart of the alternate-current power supply operation, whether a difference between the first voltage value and a second voltage value output from the rectifier is equal to or smaller than a second threshold, the second voltage value being a voltage value of direct-current power;
     disconnect the storage battery from the rectifier and from the direct-current load, when determining that the first voltage value is equal to or smaller than the first threshold, and
   reconnect the rectifier to the storage battery when determining that the difference between the first voltage value and the second voltage value is equal to or smaller than the second threshold.

8. The direct-current power supply system according to claim 7, wherein
   the first voltage value at the time of the restart of the alternate-current power supply is less than the voltage value of the direct-current power output from the rectifier before the stop of the alternate-current power supply.

9. The direct-current power supply system according to claim 7, wherein the charging and discharging control device further comprises:
   a capacitor connected to an output side of the rectifier; and
   a diode connected between the capacitor and the storage battery, the diode to preventing a current discharged from the storage battery from flowing to the rectifier.

10. The direct-current power supply system according to claim 7, further comprising:
    the storage battery connected to the rectifier and the direct-current load; and
    a storage battery monitoring unit that measures the voltage of the storage battery, wherein the charging and discharging control device receives the first voltage value from the storage battery monitoring unit.

11. The direct-current power supply system according to claim 7, wherein
the one or more processors are further configured to control, in response to the restart of the alternate-current power supply, the rectifier to set the voltage of the storage battery as a voltage of the direct-current power to be generated by the rectifier.

12. The direct-current power supply system according to claim 11, further comprising:
a first storage battery;
a second storage battery;
a first switch connected between the first storage battery, and the rectifier and the direct-current load;
a second switch connected between the second storage battery, and the rectifier and the direct-current load;
a first storage battery monitoring unit that measures a voltage of the first storage battery; and
a second storage battery monitoring unit that measures a voltage of the second storage battery, wherein
the one or more processors are configured to:
determine, in response to the restart of the alternate-current power supply, whether a voltage value of the first storage battery and a voltage value of the second storage battery are different from each other,
set, when determining that the voltage value of the first storage battery and the voltage value of the second storage battery are different from each other, the voltage value of the first storage battery to the rectifier as a voltage of the direct-current power to be generated by the rectifier, and
set, in response to the restart of charging the first storage battery, the voltage value of the second storage battery to the rectifier as the voltage of the direct-current power to be generated by the rectifier,
determine, in response to the restart of the alternate-current power supply, whether a difference between the voltage value of the first storage battery and the voltage value of the direct-current power is equal to or smaller than a second threshold,
determine, after the first switch is placed in a closed state, whether the difference between the voltage value of the second storage battery and the voltage value of the direct-current power is equal to or smaller than the second threshold,
place the first switch in the closed state when determining that the difference between the voltage value of the first storage battery and the voltage value of the direct-current power is equal to or smaller than the second threshold in response to the restart of the alternate-current power supply, and
place the second switch in the closed state when determining that the difference between the voltage value of the second storage battery and the voltage value of the direct-current power is equal to or smaller than the second threshold after the first switch is placed in the closed state.

13. The direct-current power supply system according to claim 7, further comprising:
a first switch connected between the storage battery, and the rectifier and the direct-current load;
a second switch connected between the storage battery, and the rectifier and the direct-current load in parallel to the first switch; and
a resistor connected in parallel to the first switch and in series to the second switch, wherein
the one or more processors are further configured to:
set, in response to the restart of the alternate-current power supply, a predefined float charging voltage to the rectifier as a voltage of the direct-current power to be generated by the rectifier,
place the first switch and the second switch in an open state when determining that the voltage value of the storage battery is equal to or smaller than the first threshold,
place the second switch in a closed state when setting the float charging voltage to the rectifier as the voltage of the direct-current power to be generated by the rectifier after the restart of the alternate-current power supply, and
place the first switch in the closed state when determining that the difference between the voltage value of the storage battery and the voltage value of the direct-current power is equal to or smaller than the second threshold.

14. The direct-current power supply system according to claim 7, further comprising:
a switch connected between the storage battery, and the rectifier and the direct-current load;
a discharging diode connected in series to the switch, to allow a current discharged from the storage battery to flow and prevent a current output from the rectifier from flowing;
a charging diode connected in parallel to the discharging diode, the diode preventing the current discharged from the storage battery from flowing and allows the current output from the rectifier to flow; and
a resistor connected in series to the charging diode and in parallel to the discharging diode and the switch, wherein
the one or more processors are further configured to:
set, in response to the restart of the alternate-current power supply, a predefined float charging voltage to the rectifier as a direct-current power voltage to be generated by the rectifier,
place the switch in an open state when determining that the voltage of the storage battery is equal to or smaller than the first threshold, and
place the switch in a closed state when setting the float charging voltage to the rectifier as the voltage of the direct-current power to be generated by the rectifier after the restart of the alternate-current power supply.

15. The direct-current power supply system according to claim 7, wherein
the storage battery includes a lithium-ion battery.

* * * * *